United States Patent [19]

Dublet

[11] Patent Number: 4,527,268
[45] Date of Patent: Jul. 2, 1985

[54] STRUCTURE OF AN ACCESS POINT TOWARD A DATA PACK BROADCASTING NETWORK

[75] Inventor: Guy P. Dublet, Rennes, France

[73] Assignee: Etablissement Public de Diffusion dit "Telediffusion de France", Montrouge, France

[21] Appl. No.: 522,816

[22] Filed: Aug. 12, 1983

[30] Foreign Application Priority Data

Aug. 31, 1982 [FR] France ................. 82 15139

[51] Int. Cl.³ ........................... H04J 3/00; H04J 6/00
[52] U.S. Cl. ........................................ 370/94; 370/84
[58] Field of Search ................ 370/85, 60, 92, 94, 370/84

[56] References Cited

U.S. PATENT DOCUMENTS

| | | | |
|---|---|---|---|
| 4,058,830 | 11/1977 | Guinet et al. | 358/86 |
| 4,082,922 | 4/1978 | Chu | 370/94 |
| 4,115,662 | 9/1978 | Guinet et al. | 370/92 |

OTHER PUBLICATIONS

L'utilisation du Multibus, L'interconnexion de cartes, de modules processeurs 8 ou 16 bits, ou le partage de ressources sont dans les attributions normales du Multibus, by: Andre Sabatier, 1/3/79, Electronique, No. 264.

*Primary Examiner*—Douglas W. Olms
*Assistant Examiner*—Kenneth I. Rokoff
*Attorney, Agent, or Firm*—Laff, Whitesel, Conte & Saret

[57] ABSTRACT

The structure of an access point to a data packet broadcasting network comprises a plurality of couplers (Cx), a buffer memory (MTP) and a central control unit (MPC) interconnected by a main bus (MB). Each coupler (Cx) is connected to a plurality of data sources. The buffer memory (MTP) is connected to a transmission equipment of the data packet broadcasting network. Each coupler (Cx) includes a dual access (MCx), a microprocessor (MUPx), a read only memory (ROMx), a plurality of access circuits (CAS1-CAS4 and CAP1-CAP4) each connected to a data source, a local bus (Bx). In each coupler there is stored, in addition to the coupler control software, a set of subroutines for exchanging information with the buffer memory (MTP).

The memory of the central control unit (MPC) stores the connection table relating to the established time-division switched connections between the couplers (Cx) and the buffer memory (MTP) as well as the subroutines of the interconnections established between every coupler and the data sources connected thereto.

Each coupler (Cx) still includes a local access circuit (CALx) between the dual access memory (MCx) and the local bus (Bx), and a general access circuit (CAGx) between the dual access memory (MCx) and the main bus (MB), the local access circuit (CALx) and the general access circuit (CAGx) being controlled by a control circuit (CGMx) connected to the main bus (MB).

11 Claims, 30 Drawing Figures

CONTROL CIRCUIT OCC

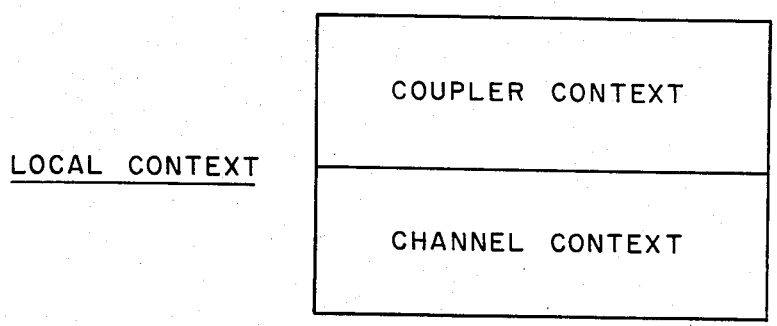

LOCAL CONTEXT
- COUPLER CONTEXT
- CHANNEL CONTEXT

COUPLER CONTEXT:

| Field | Size |
|---|---|
| CONTEXT LENGTH | 2 OCTETS |
| COUPLER NUMBER | 1 OCTET |
| TYPE OF COUPLER | 1 OCTET |
| COUPLER STATE | 1 OCTET |
| ZONE ASSIGNED TO THE OPTIONS | 8 OCTETS |

CHANNEL CONTEXT:

| Field | Size |
|---|---|
| NUMBER OF CHANNELS N | 1 OCTET |
| CHANNEL STATE TABLE | N x 1 OCTET |
| SYNCHRO WORD TABLE - OCTET - | N x 1 OCTET |
| FLOW TABLE | N x 1 OCTET |
| MAX FORMAT TABLE | N x 1 OCTET |
| CHANNEL IDENTIFIER TABLE | N x 2 OCTETS |
| ASSIGNED TO THE OPTIONS | 8 OCTETS |

FIG. 9

DIALOGUE TABLE

| | |
|---|---|
| CONTROL WORD | 1 OCTET |
| CONTROL ACCOUNT | 1 OCTET |
| OPERATING STATE OF THE COUPLER | 1 OCTET |
| CONTROL PARAMETER ZONE | 8 OCTETS |
| ADDRESS OF THE OUTPUT BUFFER STATE TABLE | 2 OCTETS (MODE DE TRANSFERT) |
| ADDRESS OF THE LOCAL CONTEXT IMAGE | 2 OCTETS (MODE COMMANDE) |

LIST OF THE CONTROL ACCOUNTS

00 H _____ CONTROL ACCEPTED
01 H _____ CONTROL UNKNOWN
02 H _____ CONTROL DISREGARDED
03 H _____ PARAMETERS UNCORRECT
04-07H _____ RESERVED
08 H - 07 FH _____ SPECIAL IN FUNCTION OF THE OPTIONS

FIG. 10

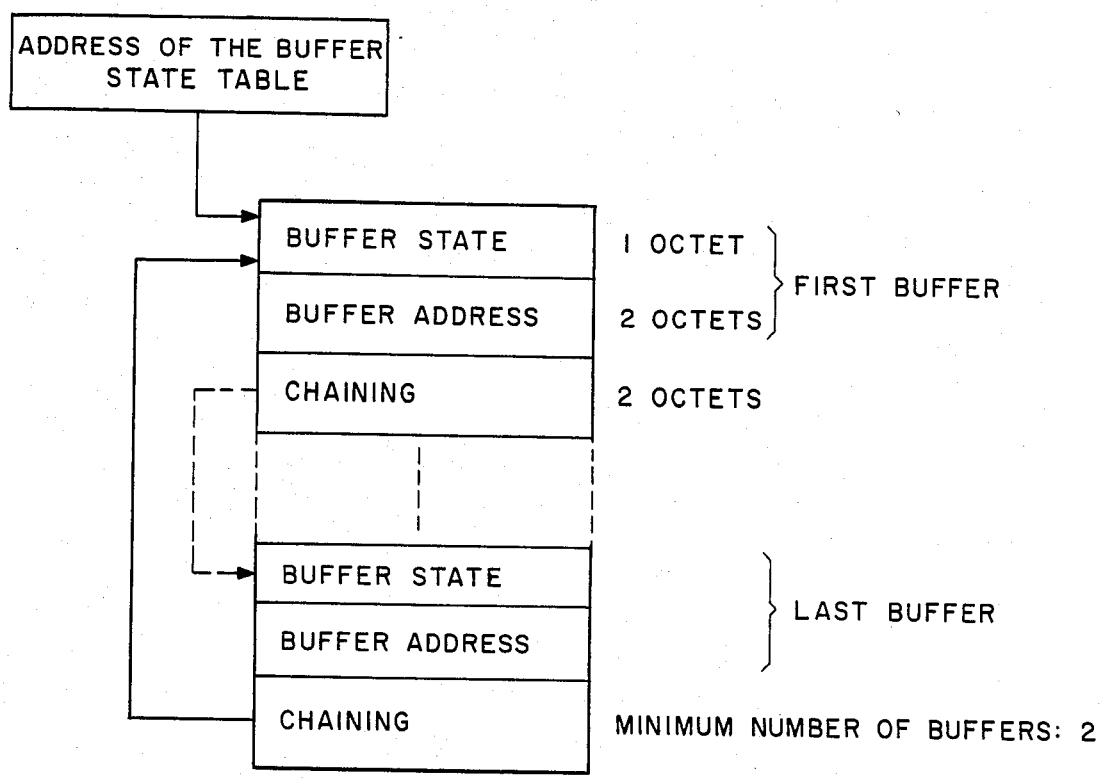
DETAILS ON THE BUFFER STATE
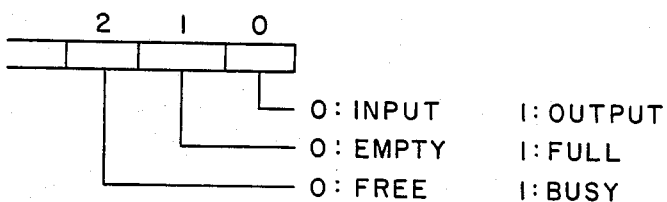
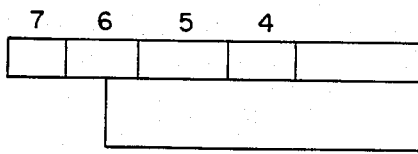
PAGE NUMBER (FROM 0 TO 15)
FIG. 13

| 6 | CODE HEXA | 5 | 4 | 3 | 2 | 1 | 0 | LEV 1 | LEV 2 |
|---|---|---|---|---|---|---|---|---|---|
| 0 | 20 | 1 | 0 | 0 | 0 | 0 | 0 | 0 | 0 |
| 0 | 21 | 1 | 0 | 0 | 0 | 0 | 1 |   | 0 |
| 0 | 22 | 1 | 0 | 0 | 0 | 1 | 0 | 0 | 1 |
| 0 | 23 | 1 | 0 | 0 | 0 | 1 | 1 | 1 | 0 |
| 0 | 26 | 1 | 0 | 0 | 1 | 1 | 0 | 0 | 1 |
| 0 | 27 | 1 | 0 | 0 | 1 | 1 | 1 | 1 | 0 |
| 0 | 10 | 0 | 1 | 0 | 0 | 0 | 0 | 0 | 0 |
| 0 | 11 | 0 | 1 | 0 | 0 | 0 | 1 | 0 | 0 |
| 0 | 12 | 0 | 1 | 0 | 0 | 1 | 0 | 0 | 0 |
| 0 | 13 | 0 | 1 | 0 | 0 | 1 | 1 | 1 | 0 |
| 0 | 16 | 0 | 1 | 0 | 1 | 1 | 0 | 0 | 1 |
| 0 | 17 | 0 | 1 | 0 | 1 | 1 | 1 | 1 | 0 |
| 0 | 08 | 0 | 0 | 1 | 0 | 0 | 0 | 0 | 0 |
| 0 | 09 | 0 | 0 | 1 | 0 | 0 | 1 | 0 | 0 |
| 0 | 0A | 0 | 0 | 1 | 0 | 1 | 0 | 0 | 0 |
| 0 | 0B | 0 | 0 | 1 | 0 | 1 | 1 | 0 | 0 |
| 0 | 0E | 0 | 0 | 1 | 1 | 1 | 0 | 0 | 0 |
| 0 | 0F | 0 | 0 | 1 | 1 | 1 | 1 | 0 | 0 |
| 1 | IDEM FOR TYPE B | | | | | | | | |

*FIG. 28*

STRUCTURE OF AN ACCESS POINT TOWARD A DATA PACK BROADCASTING NETWORK

The present invention relates to the structure of an access point toward a data pack broadcasting network and, more particularly, to a DIDON broadcasting network.

A data pack broadcasting system with its various embodiments has been described in the U.S. Pat. Nos. 4,058,830 and 4,115,662. Such a sytem has been implanted by the French public broadcasting company "Télédiffusion de France" and is known as the "DIDON system".

In the article "Construction d'un réseau de diffusion de données par paquets: le point d'accés DIDON", published in the technical review "Radiodiffusion-Télévision" No. 60, November-December 1979, by Y. Noirel and analysis of the recent and desired development of the video-data multiplexing equipments is made with the conclusion that the access to the DIDON system, input and output, should be processed through a special coupler mounted within a switching node, called "access point", which establishes a number of connections between a set of inputs and a set of outputs. In particular, in this article an access point is described which comprises a set of network couplers, a DIDON system coupler, a main memory and a central unit which are connected through a bus of the "multibus type". In addition to the coupler control software, a number of subroutines are established in each network coupler for allowing the exchanges with the main memory. The inter-network communications are established through virtual channels. The main memory, wherever the transmitted data are stored, comprises a connection table describing the connections established through the virtual channels.

A purpose of the present invention is to provide an access point structure which may be used in the transmitting equipments of a such data broadcasting network.

It will be reminded that a data broadcasting network should be able to serve a number of sources in a time-division mode. The sources may have very different characteristics with respect to their throughputs and their intelligence. For some sources, it is necessary to control high-level protocols such as X25 for instance, while for others a buffer memory is needed in the broadcasting network for cyclically broadcasting their messages. Finally the number of the sources to be connected at a particular site of the broadcasting network may vary within a large range.

According to a feature of the invention, a shared intelligence access point structure is provided, which comprises a number of modules connected through a bus, the modules comprising a central processing module for insuring in particular the general functions of the central of the other modules, a multipler module for acquiring the data packs formed in the various network access couplers, an inserting-modulating module directly connected to the output of the multiplexer module while insuring the matching to the broadcasting network, and a control and supervision organ.

According to another feature of the invention, the access point comprises a plurality of couplers, a buffer memory and a central control unit which are connected through a bus, each coupler being connected from a plurality of data sources, the buffer memory being connected to a transmission equipment of the broadcasting network, a set of subroutines being stored in each coupler in addition to its control software for allowing the exchanges with the buffer memory, the memory of the central control unit containing the connection table describing the connections which are established between the couplers and the buffer memory in a time-division mode, as well as, for each coupler, the subroutines of the interconnections between said coupler and the sources to which it is connected from.

The above mentioned features of the present invention as well as others will appear more clearly from the following description of a particular embodiment, said description being made in conjunction with the accompanying drawings, wherein.

Figure 1:
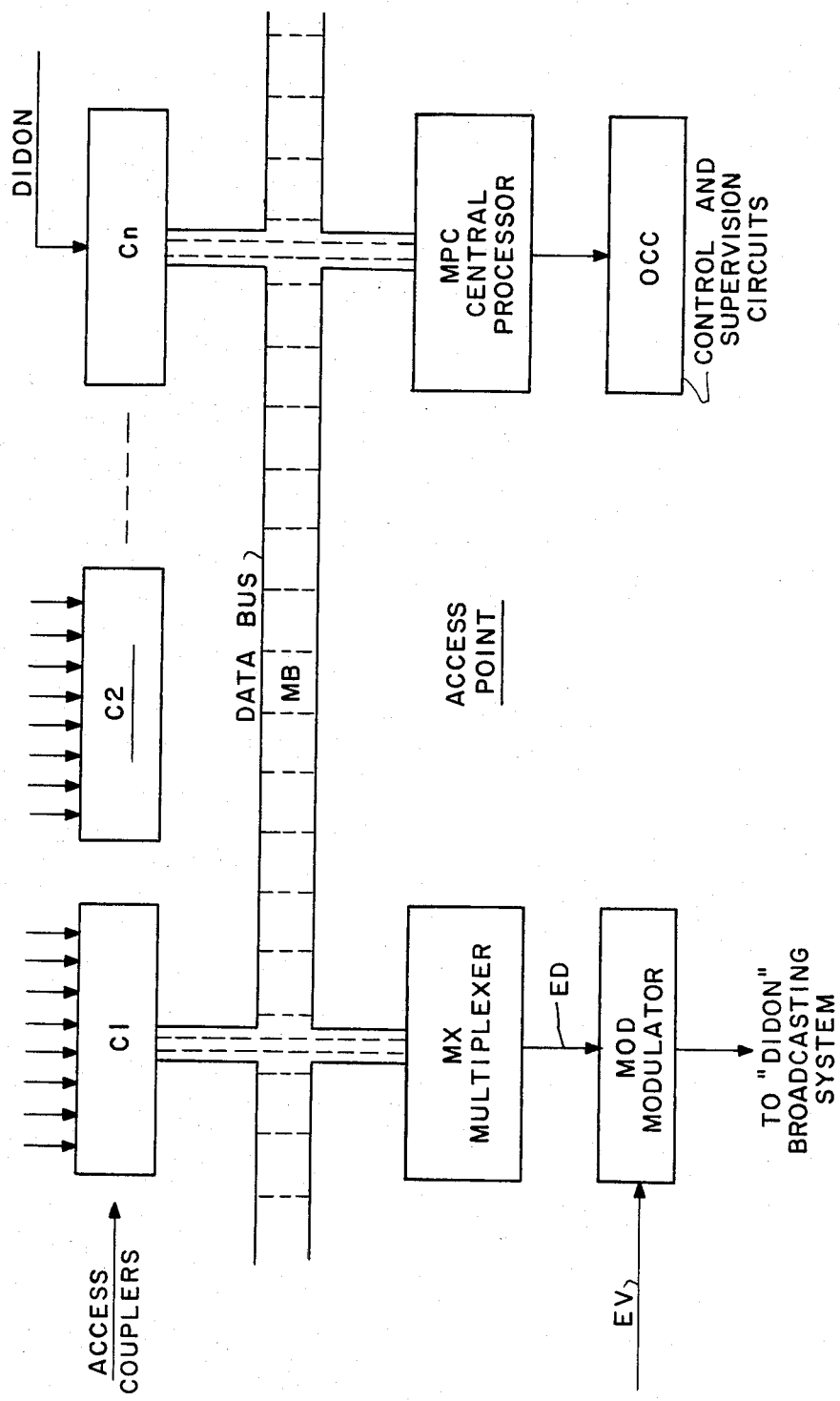
FIG. 1 is a block-diagram of an access point according to the invention.

The access point shown in FIG. 1 comprises a central processor MPC, a multiplexer MX, a number of access coupler C1-Cn, a bus MB interconnecting those circuits, a control and supervision organ OCC connected to the processor MPC, and an inserting-modulating circuit MOD mounted between the multiplexer MX and the used broadcasting network. In practice, a printed circuit card is provided for each circuit MPC, OCC, MX, C1-Cn and MOD.

The bus MB is of the MULTIBUS type manufactured by the U.S. company INTEL.

Figure 2:
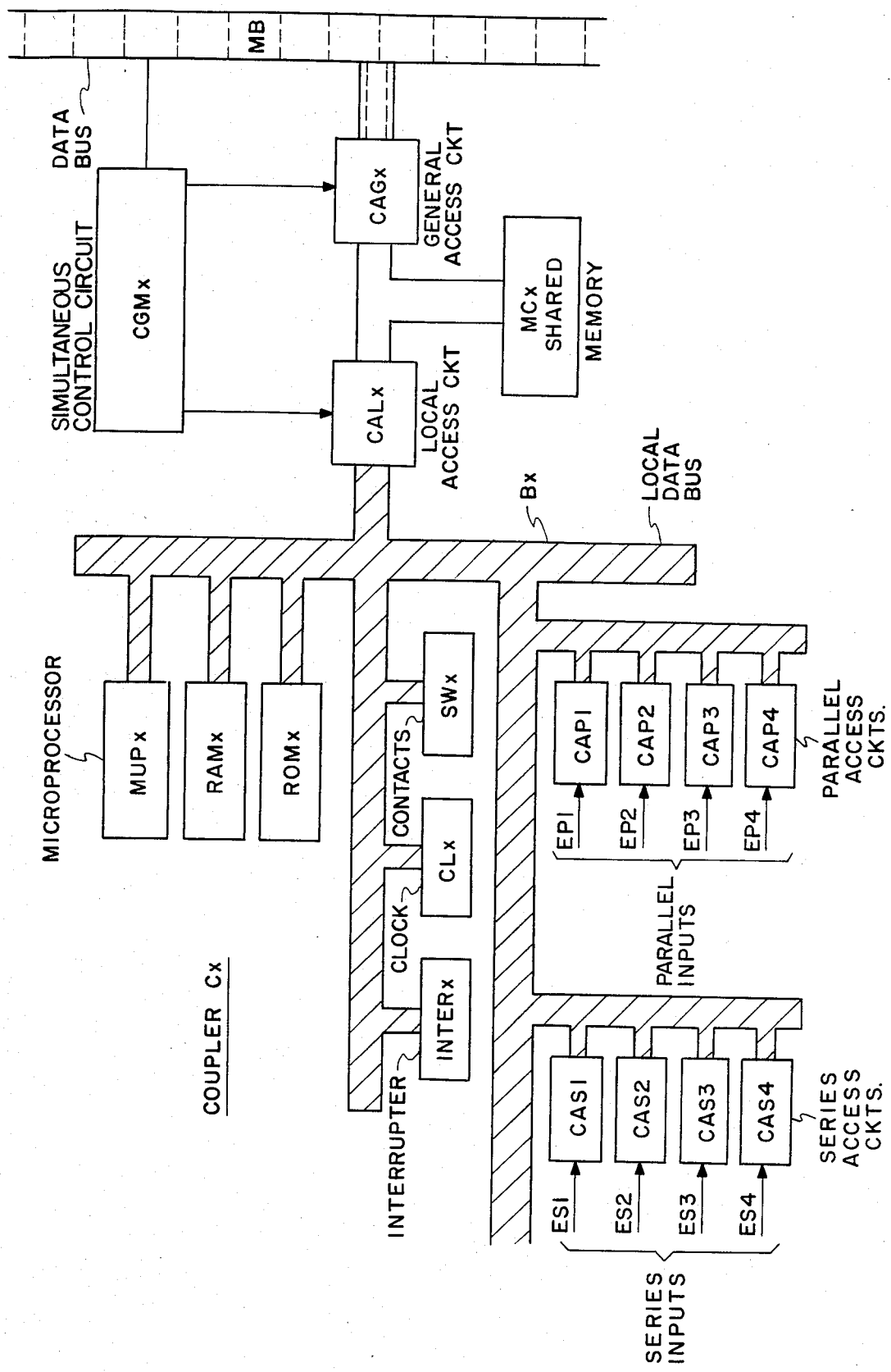
FIG. 2 is the block-diagram of a coupler shown in FIG. 1.

An input coupler Cx is shown in FIG. 2. Physically, it is a eight inputs microcomputer type card. The eight inputs comprises four series inputs ES1 ES4 and four parallel inputs EP1 EP4. The series inputs ES1 ES4 comply with CCITT standard V24 of CCITT, while paralle inputs EP1 EP4 comply with the data processing liaison described in the French Patent No. 2,268,308.

The coupler Cx comprises a double access shared memory MCx, a microprocessor MUPx, a random access memory RAMx, a read only memory ROMx, an interrupt circuit INTERx, a clock CLx, a number of contacts SWx, a number of series access circuits CAS1 CAS4 respectively connected to the series inputs ES1 ES4, and a number of parallel access circuits CAP1 CAP4 respectively connected to the parallel inputs EP1 EP4. The shared memory MCx is associated with a local access circuit CALx and a general access circuit CAGx. Toward outside (with respect to memor MCx), the circuit CALx is connected to the other circuits of the coupler through a local bus Bx while the circuit CAGx is connected to the multibus MB. Toward inside, circuits CALx and CAGx are conventionally connected to the memory MCx. Finally, the respective control inputs of the circuits CALx and CAGx are connected to the corresponding outputs of a control circuit CGMx which is itself connected to the multibus MB.

Thus, the memory MCx may be either addressed by the processor MUPx through the bus BX and the circuit CALx, or by any other processor of the other modules of the access point through the multibus MB. In the latter case, the coupler is operating in slave mode. In addition, the circuit CAGx allows the coupler to access also to the multibus in master mode for accessing to external ressources, such as memories or input/output devices.

The interrupt circuit INTERx makes it possible to detect a incoming data on one of the eight access ES1--ES4 and EP1-EP4. The clock CLx generates the bit frequencies needed for the operation of the series inputs ES1 to ES4. The group of microcontacts SWx allows to change at will the operation parameters of the series inputs ES1 to ES4, such as the length of the characters, the number of elements STP, the parity.

The internal random access memory RAMx is used for storing the coupler data which are purely local, thus preventing the shared memory MCx from being unnecessarily charged, the memory MCx being thus only assigned to the data to be transferred through the multibus MB.

The software stored in a coupler will be described in details in the following.

By way of illustrating purposes, a coupler card is preferably made by using the circuits INTEL 8251 for CAS1 CAS4, the circuits LATCH 74LS374 for CAP1 CAP4, a circuit INTER 8085 for MUPx, a 2K octet memory HM6116 for RAMx, two 4K octet memory circuits 2732 for ROMx, a circuit INTEL 8259 for INTERx, a circuit INTEL 8253 for CLx, two 4K octet memory circuits HM6116 for MCx, a circuit 74LS240 for CALx, a circuit INTEL 8286 for CAGx, a circuit INTEL 8219 for CGMx, and switches AMP for SWx.

Figure 3:
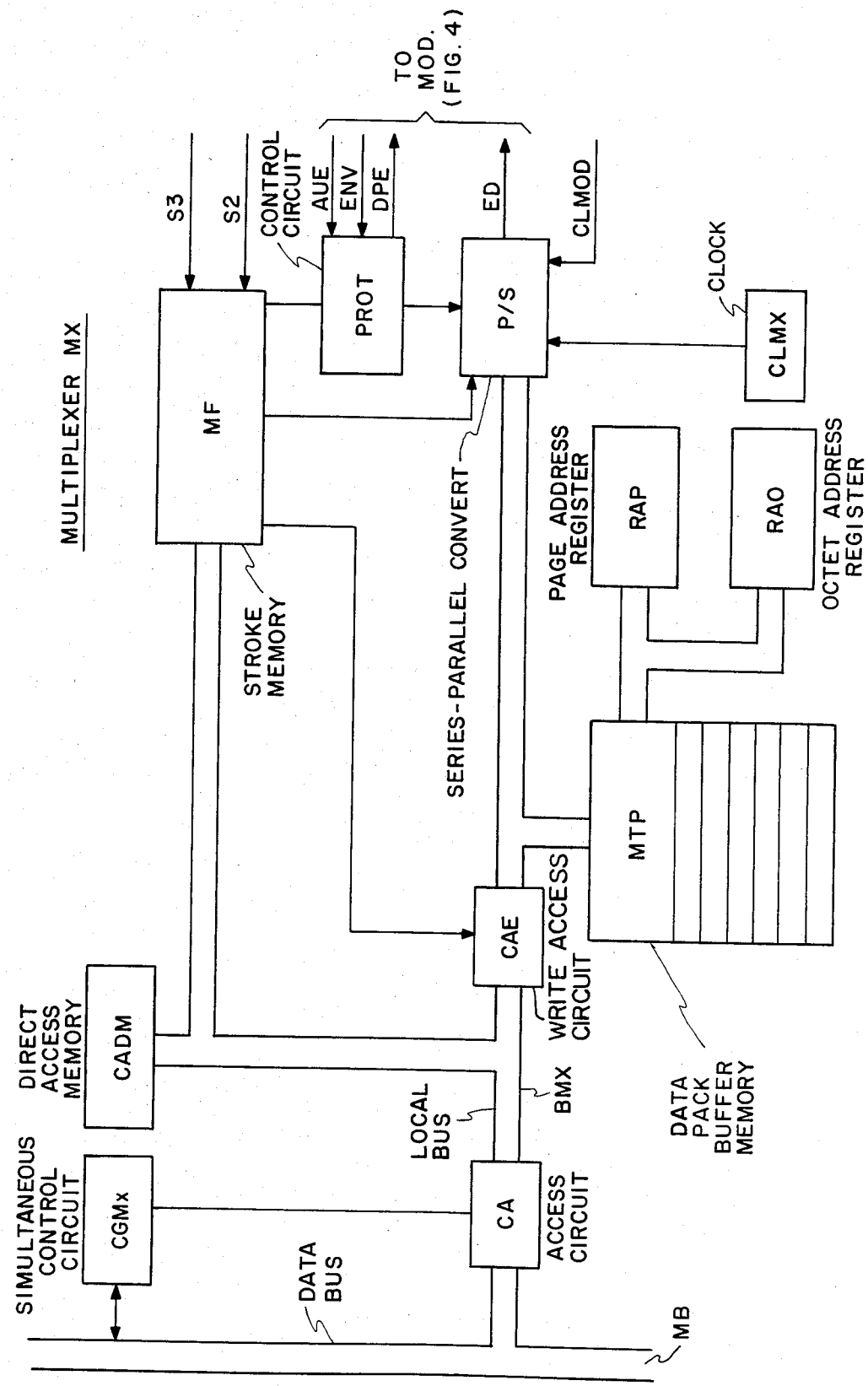
FIG. 3 is the block-diagram of the multiplexer shown in FIG. 1.

The multiplexer MX is shown in FIG. 3. It is a non-intelligent circuit without any processor.

The multiplexer MX comprises an access circuit CA used as an interface between the multibus MB and a local bus BMX, a simultaneous control circuit CGMX connected to MB and CA, a pack buffer memory MTP which is associated to a write access circuit CA and a series/parallel converter P/S of which the input circuit is used as a read access circuit for the memory MTP. It also comprises a memory direct access circuit CADM, page address registers RAP and octet address registers RAO, a stroke memory MF, a control circuit PROT and a clock CLMX. The bus BMX interconnects the circuits CA, CAE, CADM and the memory MF. The memory MF controls the circuit CAE and the converter P/S. The circuit PROT is connected to the memory MF and the converter P/S.

The basic function of the multiplexer MX is to operate as a buffer memory between couplers C1 Cn and the modulator MOD. If the transmission support of the network is a TV public broadcasting network as hereinabove mentioned, the multiplexer has specific characteristics which will be mentioned hereinafter.

The DIDON packs previously formed in one or more of the couplers C1 Cn can be read into the multiplexer, through the memory direct access circuit CADM associated with the central circuit CA of the multibus MB. So it can access to the bus MB in master mode for generating the memory addresses corresponding to the location of the packs in the couplers C1 Cn.

The memory MTP is arranged in pages the programmable size is adjusted with respect to the size of the broadcasted packs. The memory MTP is a double access memory, one for the write mode controlled by the memory direct access circuit CADM through CAE, the other for the read mode controlled by a dispatch boolean circuitry comprising the group of circuits MF and PROT.

The pack buffer memory MTP is addressed at two levels:
 a page selection level: at any time in the register RAP, the number of the last written page and the one of the last read page are marked by pointers,
 an octet level in the page: in RAO, an index operates both in write and read phases.

The pack dispatch boolean circuitry is provided for the use of the DIDON network on a video support. It is necessary that the packs can be inserted on one or several selected previously lines in each TV frame. Furthermore, within a line, it is necessary that the pack can be inserted at a precise time corresponding to the beginning of the active line.

To this end, the central circuit PROT insures the central of the protocol with the modulator MOD, the latter allowing to acquire the insertion time slots. The number of the TV lines for which the data insertion is authorized are stored in the stroke memory MF. The memory MF may be programmed from the central processor MPC through the multibus MB. Readout of the buffer memory MTP is authorized by the memory MF only at the times for which the latter has been programmed. Readout of a pack is indeed started by the dispatch boolean circuitat a precise time provided from the modulator MOD, of course when the memory MTP is not empty. The data read out from memory MTP are arranged in series in the converter P/S the output of which is connected to the modulator MOD. The data are supplied from the converter P/S at a bit frequency which is determined by the clock CLMOD of the modulator. The internal clock CLMX of the multiplexer may be used in case the clock CLMOD is defective.

The output of the converter P/S is connected to the modulator MOD through the connection ED. Two inputs AUE and ENV and an output DPE of the circuit PROT are connected to the corresponding outputs and input of the modulator MOD. The signal AUE: "transmission authorized" received at input AUE indicates to the circuit PROT that the circuit MOD is ready to receive a transmission demand. The signal DPE: "transmission demanded" formed on the output DPE is the answer from the circuit MX to the signal AUE and indicates that the multiplexer has data to be transmitted. The signal ENV: "send data" received on the input ENV is the logical effect of the dialogue AUE-DPE and invites the multiplexer MX to transmit.

By way of illustration purposes circuits CGM, CADM, MTP, MF, RAP, RAO, CA, CAE, P/S and PROT are preferably and respectively made with the circuits INTEL 8218, 8237, HM6176 (four 2K octet circuits), 2125, 74LS150, 74LS491, INTEL 8286, 8286, 74LS166 and 74LS74.

Figure 4:
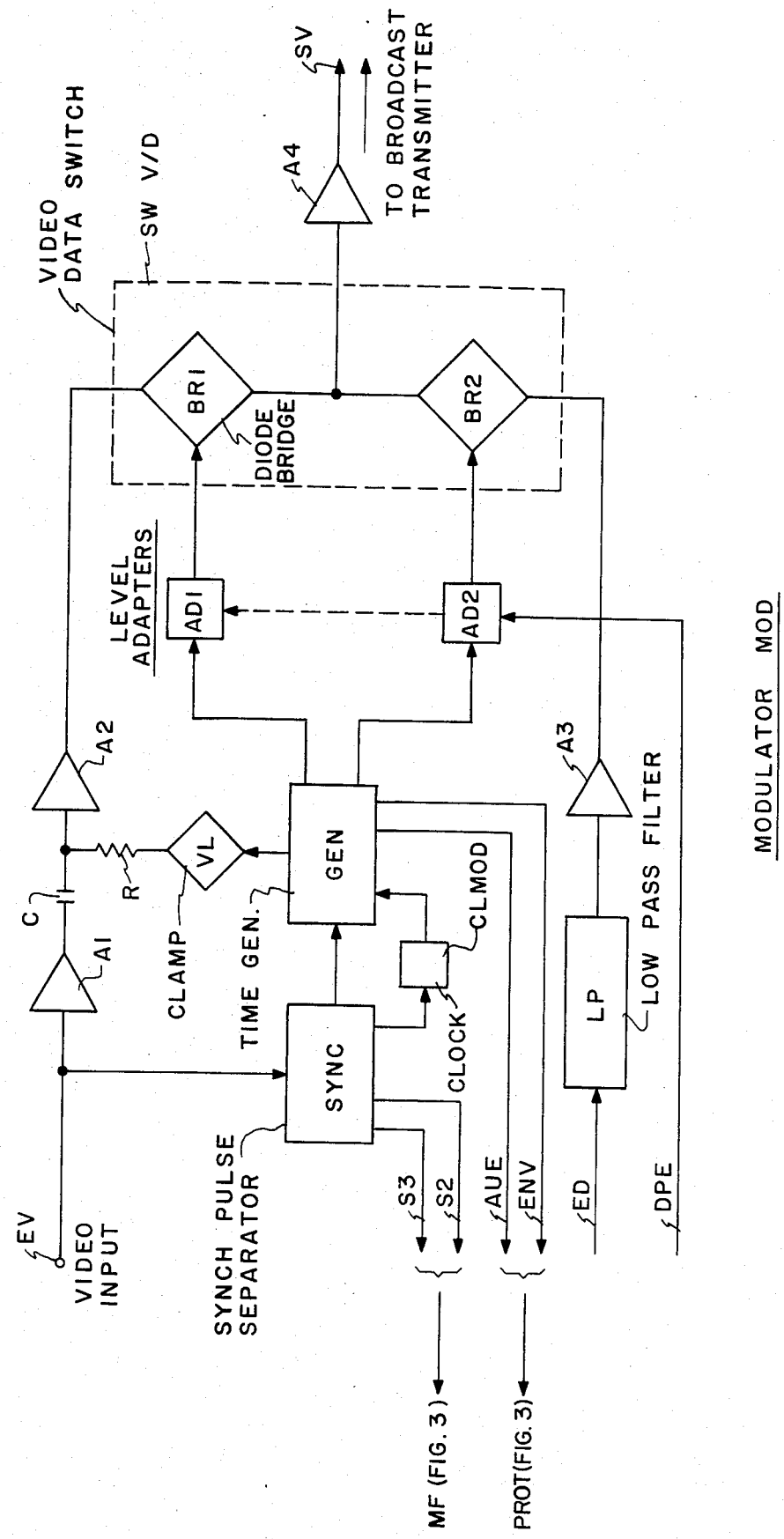
FIG. 4 is the block-diagram of the modulator shown in FIG. 1.

The general function of the modulator MOD shown in FIG. 4 is to adapt the data supplied by the multiplexer MX to the transmission support which, in this case, is a video signal.

The video input EV of the modulator, which is connected from the output of a video generator such as a TV camera, is connected to an amplifier A1 on one hand, and, on the other hand, to the input of an separating circuit SYNC for providing line and frame sync signals. The output of the amplifier A1 is connected to the input of another amplifier A2 through a connecting capacitor C. The output of the amplifier A2 is connected to a first signal input of a video-data switch SWV/D.

One output of the circuit SYNC is connected to the input of a characteristic time generator GEN. That output transmits the line sync signals to the generator GEN. Two other outputs S2 and S3 of the circuit SYNC are connected to the control input of the stroke memory MF of the multiplexer MX. The leading signal of a TV picture are transmitted through the output S2 and the output S3 is used for identifying the lines of the picture by counting those lines. At last, one output of the circuit SYNC, which supplies the line frequency signal, is connected to the sync input of a crystal clock CLMOD of which the output is also connected to the generator GEN.

Two outputs of generator GEN constitute the outputs AUE et ENV of the modulator MOD toward the circuit PROT of the multiplexer MX. Two other outputs are respectively connected to the signal inputs of two level adaptors AD1 and AD2, of which the control inputs are connected to the input DPE of the modulator. The last output of the generator GEN is connected to the input of the amplifier A2 through a clamping circuit VL and a resistor R.

The data to be transmitted by the modulator MOD are supplied by the converter P/S, FIG. 3, through the wire ED which is connected to the input of a filter LP. The output of filter LP is connected to the input of an amplifier A3 of which the output is connected to the second input of the switch SWV/D. The output of the switch SWV/D is connected to a broadcasting transmitter, not shown, through an amplifier A4.

The switch SW/D comprises two diode bridges BR1 and BR2 of which the inputs are respectively controlled by the outputs of the circuits AD1 and AD2. The outputs of the bridges BR1 and BR2 are connected to the output of the switch. In practice, only one of the bridges BR1 and BR2 operates at a given time, the operation times thereof being determined by the geneator GEN, through the level adaptors AD1 and AD2.

The filter LP is used as a shaping circuit for the binary data transmitted from the multiplexer MX in such a way that their frequency spectrum coincides with the width of the video channel used in the broadcasting transmitter. On the other hand, the amplifiers A3 and A4 and the adaptors AD1 and AD2 are so designated that the output electric level of A4, for the bits "1", has a value equal to the white level (700 mV) or a given adjustable proportion of the white level.

The generator GEN may be a ROM addressed by the clock CLMOD for supplying the following signals:
- a data/video switching signal which will be described hereinafter,
- an insertion start signal AUE intended for the multiplexer MX, and
- a line start for synchronizing the clamping circuit VL.

In the switch SWV/D, the switching between the two bridges BR1 and BR2 is controlled at a characteristic time at the beginning of the line, by the data-video switching signal supplied by the generator GEN, on one hand, and, on the other hand, by the insertion window signal supplied to DPE by the stroke memory. For a TV line transmitting standard video signal, the adaptor AD1 is enabled for insuring the transmission through the bridge BR1, and the clamping circuit VL adjusts the blanking level of the incoming video channel to OV, i.e. a potential equal to the "0" level on the data channel at the output of A3. For a data transmitting line, the adaptor AD2 is enabled for insuring the transmission through the bridge BR2, from the beginning of the active line which follows the standard analog line start signal.

For illustration purposes, the various circuits of the modulator MOD may be selected as it follows: TDB2022 for amplifiers A1 and A4; LH0033 for amplifiers A2 and A3; 1K octet memory 6349 for generator GEN; HP2813 for bridges BR1 and BR2, the filter LP being a low-pass filter.

Figure 5:
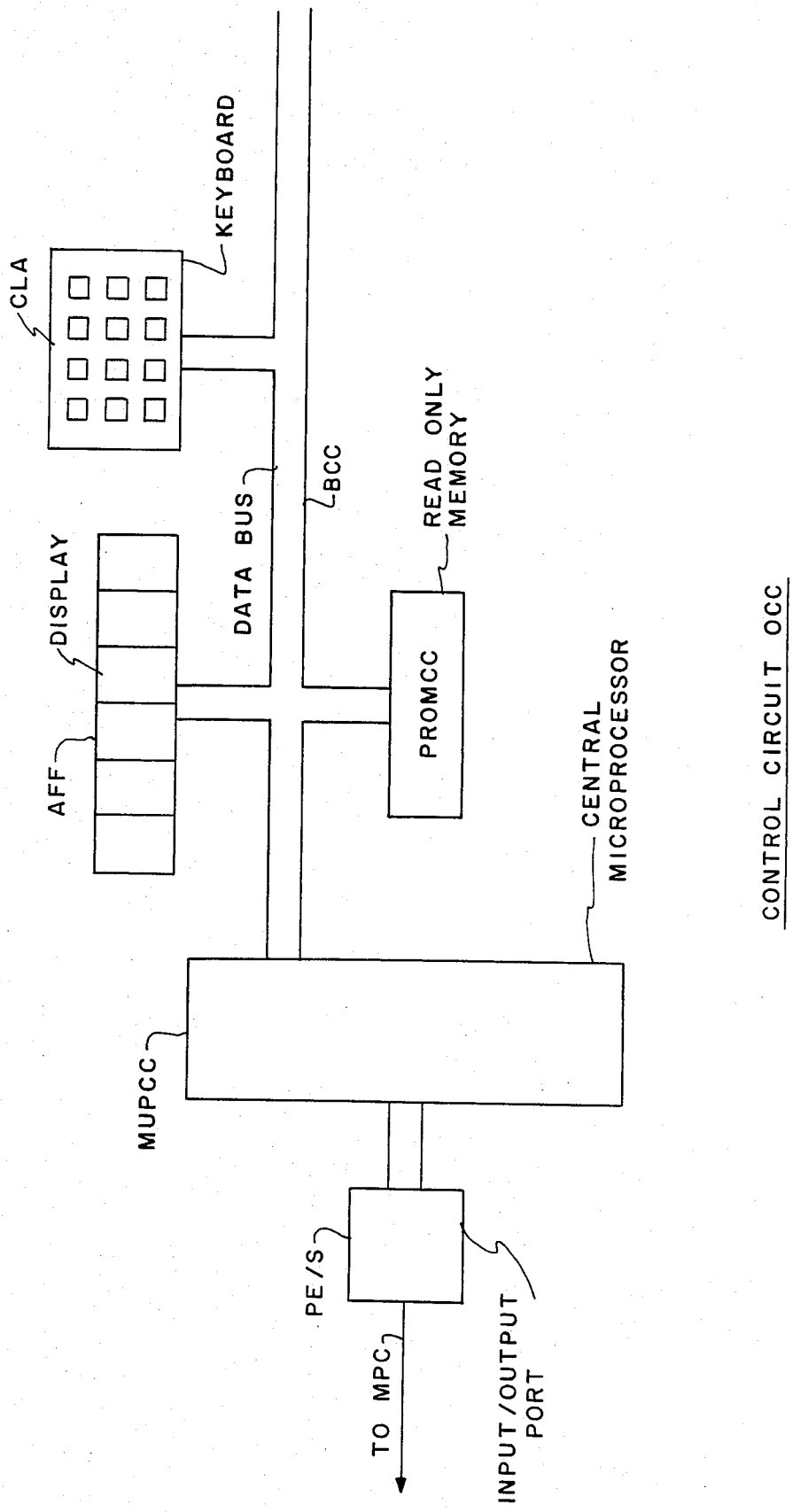
FIG. 5 is the block-diagram of the control organ shown in FIG. 1.

The control and supervision circuit OCC show in FIG. 5 is used for insuring the connection between the operator and the central processor MPC of the access point.

The circuit OCC comprises an alphanumeric keyboard CLA, a display AFF, a processor MUPCC and a read only memory PROMCC, said devices being connected through the bus BCC. The processor MUPCC is connected to an input/output port PE/S which is connected to the central processor MPC.

The keyboard CLA has twelve keys and the display device AFF has six electroluminescent elements.

The processor MUPCC is so programmed that it detects when a key has been pushed by the operator and transmits the code of the pushed key to the central processor MPC, through PE/S. In the other direction, the processor MUPCC receives the codes transmitted by the central processor MPC, through PE/S, said codes being displayed on one of the six elements of the display unit AFF.

A short protocol for the dialogue between the central processor MPC and the control circuit OCC allows to perform some elementary functions such as the erasing of the display and the enabling or disabling of the keyboard.

By way of examples, the various circuits of OCC may be selected as follows: Keys PREH for keyboard CLA; display elements TIL311 for devices AFF; processor 8035 for MUPCC; 2K octet memory 2716 for PROMCC, and circuit 8286 for PE/S.

The central processor MPC operates as a master. It performs the connection with the operator through OCC. It performs the test of the couplers C1 Cn and informs the multiplexer MX of the locations where the packs to be transmitted are. It will be recalled that, contrary to the couplers, the multiplexer is not an intelligent organ and that it cannot perform by itself the test of the couplers. At last, the processor MPC controls the synchronization of all the processors of the access point when the system is first initiated. The processor may be a processor of the type INTEL 8024-2.

Figure 6:
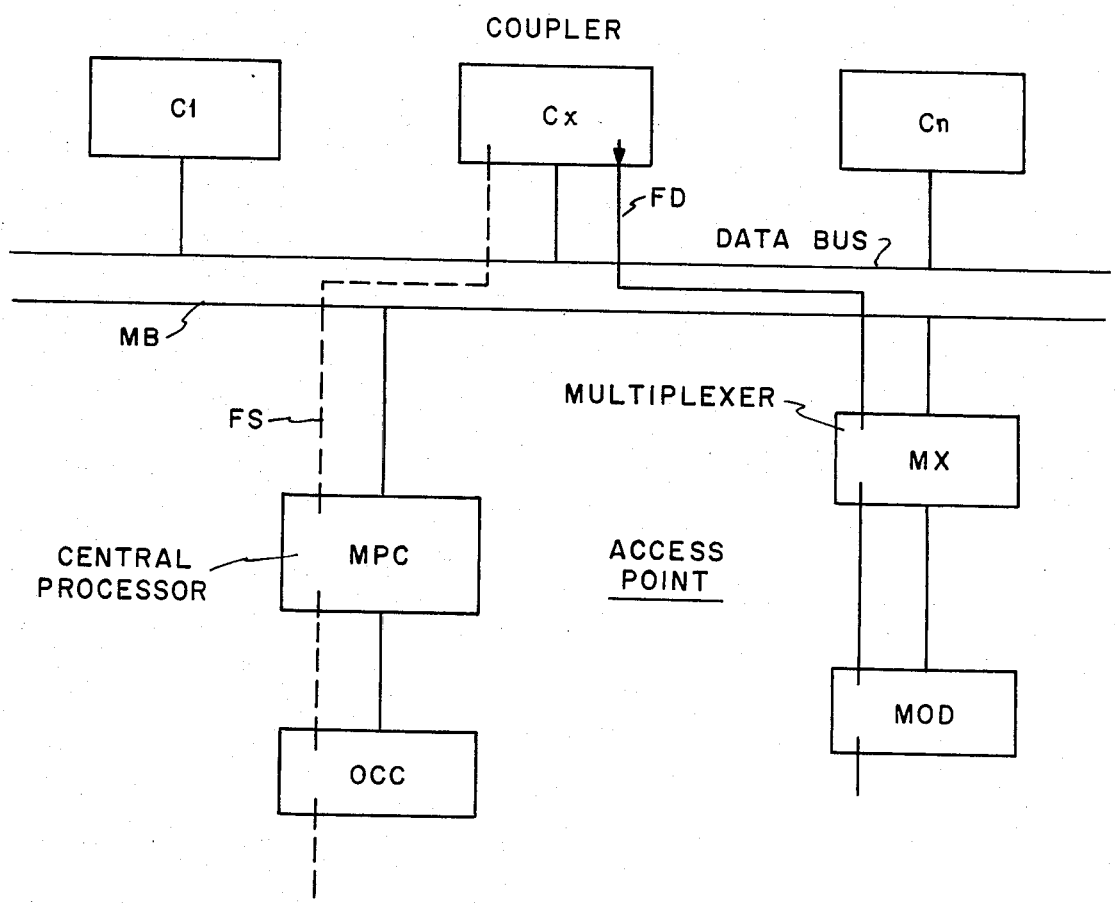
FIG. 6 is a schematic diagram illustrating the operation of the access point shown in FIG. 1, FIGS. 7–13 illustrate the control modes software of the access point shown in FIG. 1, FIGS. 14–20 illustrate the software of the central processor shown in FIG. 1, and FIGS. 21–30 illustrate the software of a coupler shown in FIG. 1.

As shown in FIG. 6, the data flows, as indicated by the full line FD from Cx to MX, are obviously carried through the bus MB of the type MULTIBUS, but they are not transmitted through the central processor MPC. A direct access is provided to the memory of a coupler from the multiplexer.

The signalling flows indicated by the dotted line FS are also carried through the bus MB.

Two modes may be defined for the rules of the dialogue between the coupler processors and the central processor:

the transfer mode for a dialogue controlling the DIDON pack exchanges between the couplers and the multiplexer, under control of the central processor, which is in fact the dialogue in continuous mode, the control mode, for a dialogue controlling the signal information exchanges between the central processor and the couplers.

For the dialogue rules in control mode, and before describing the control software, it will be recalled that while the couplers are intelligent, but yet they are slaves and they cannot appropriate the general bus MB. The couplers C1-Cn operate only as memories with respect to the central processor MPC. The dialogue in control mode is performed through write/read operations in tables located in the memories RAMx of the couplers. More specifically, the dialogue tables are located at the beginning of the memories RAMx.

Concerning the software of the control mode, the notion of "context" will first be defined.

All the variables of such a software are grouped in a "general context". It is this group and only this group which can be changed by the operator; a parameter which is not in the general context is considered as a constant.

Figure 7:
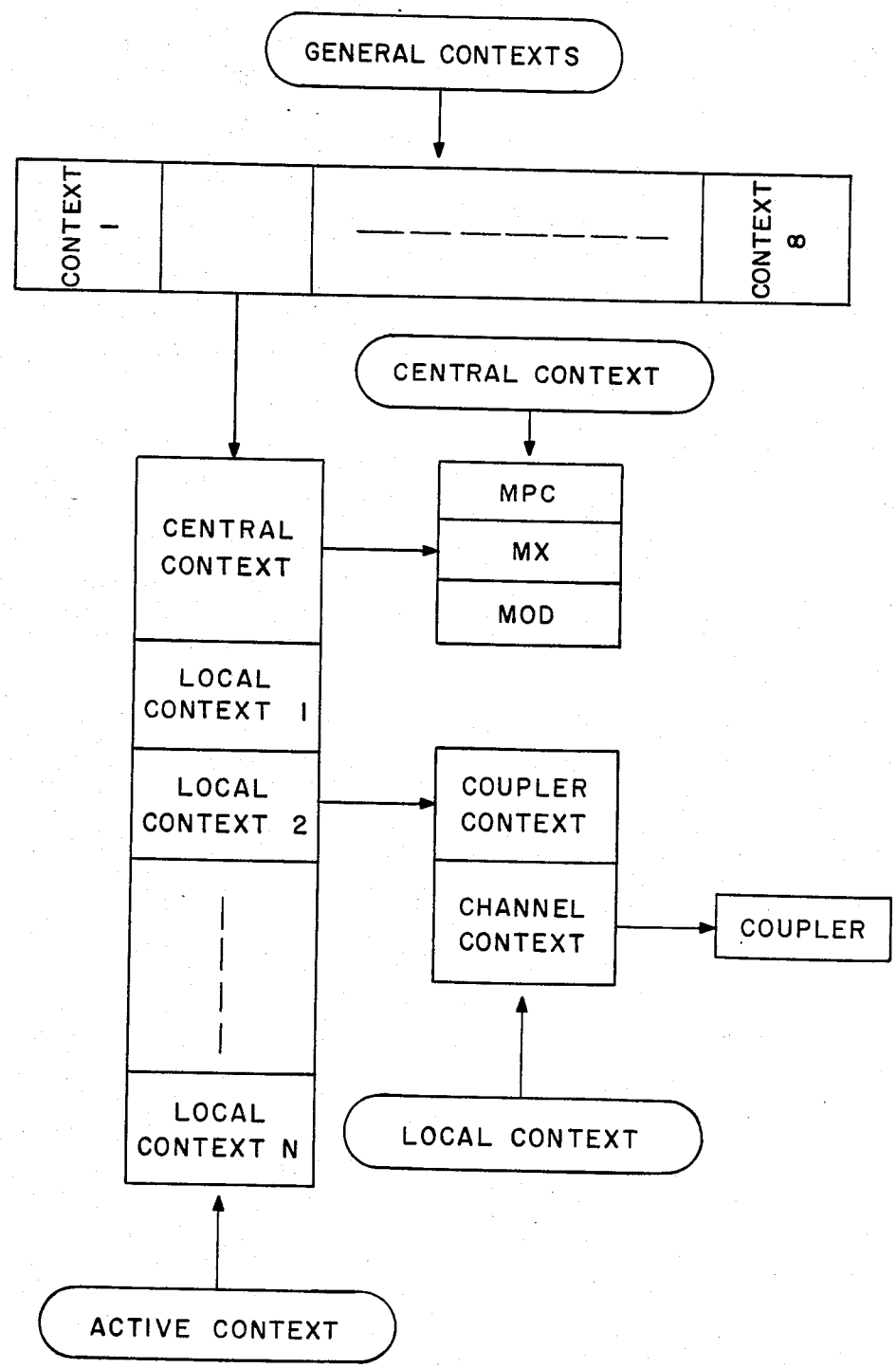

In fact, there is a group of eight general contexts in the central memory of the central processor MPC, which are shown FIG. 7. Said general contexts are preprogrammed and added to the software of the central processor MPC. At a given time, one of the general contexts chosen by the operator is enabled, i.e. the values of its variables are used by the central processor MPC and also by the couplers C1 Cn and the multiplexer MX.

A general context comprises two parts:
a "central context" which groups all the data relative to the central part of the system: central processor MPC, multiplexer MX, modulateur MOD, and
a set of "local contexts" which group the data relative to each of the couplers.

Figure 8:
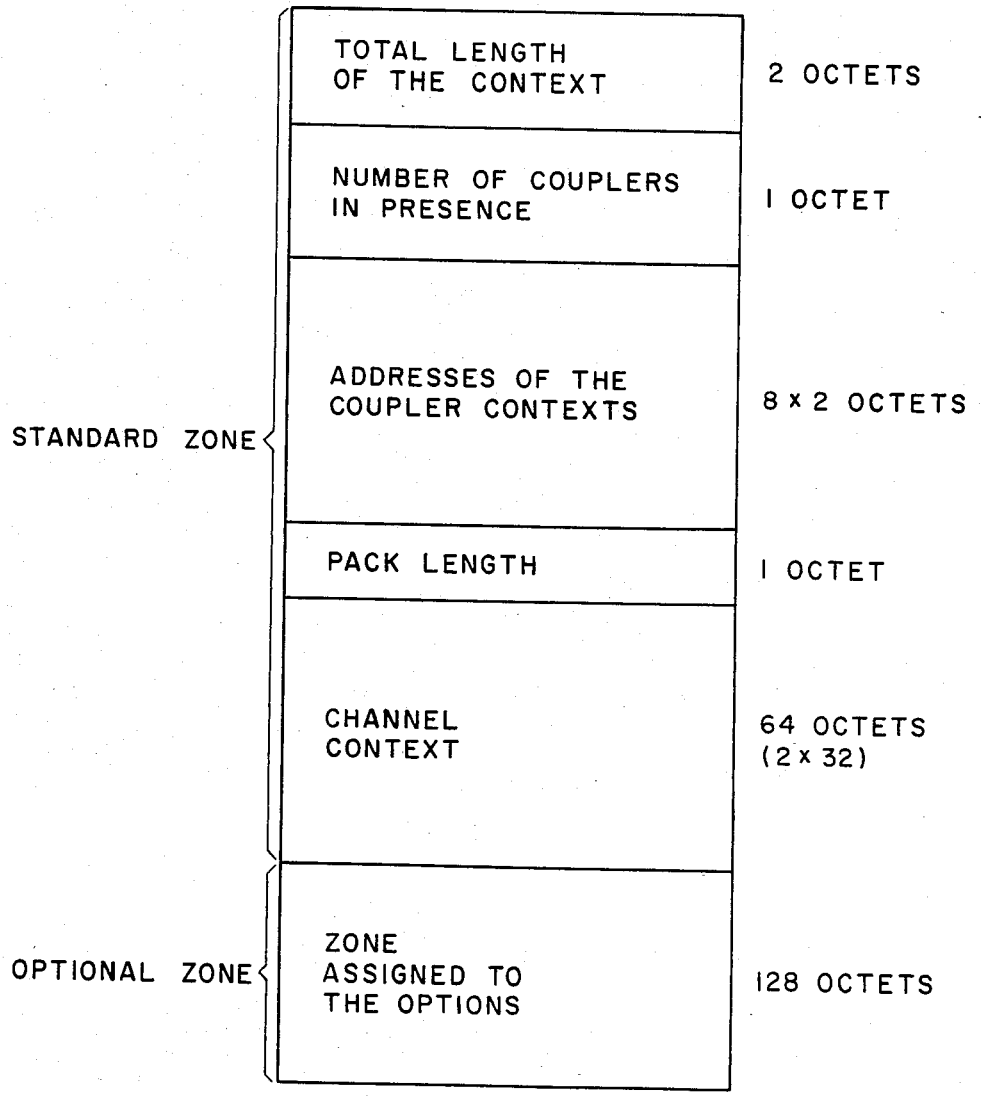

A central context is shown in FIG. 8 and comprises two parts:
a "standard zone" common for all the applications;
an "optional zone" depending on the application.
A standard zone comprises, in order:
the length, in octets, of the general context, the length information occupying two octets;
the number of couplers, occupying one octet;
the adresses of the contexts of the couplers with reference to the beginning of the general context, each address occupying two octets with the light weight octet in first, 8 addresses being provided, that corresponds to a field having a size of 16 octets;
the maximum length of the DIDON packs, occupying one octet, being understood that the maximum number of octets in a pack comprises the header;
the context zone of the channels comprising, per channel, the number of the digital channel XYZ and the number of the coupler which manages the access which channel XYZ is connected to, two octets being used for each channel, the first octet indicating the values of X and Y and the second one the values of Z and the coupler number, resulting in a zone of 64 octets for simultaneously controlling 32 channels DIDON.

Under the channel context, a zone of 128 octets is reserved to the options.

It will be noticed that, in the following and in compliance with the rules defined for the circuits INTEL, any data or address value occupying two octets in the memory has its light weight octet in first.

In the described embodiment, the couplers are numbered from 1 to 8. A common number "15" is used for materializing the central processor MPC in order to have the possibility of generating digital channels within the access point, as a test channel for instance.

A local context is shown in FIG. 9 and comprises two parts:
a coupler context grouping the data common to all the channels processed by the coupler, and
a channel context grouping the data respectively relating to each channel processed by the coupler.

A coupler context comprises, in order:
the total length of the local context, occupying two octets;
the number of the coupler, between 1 and 8, thus occupying 1 octet, that number allowing to identify a coupler with respect to the others, and a specific RAM memory addressing field corresponding to each coupler number;
the type of coupler, occupying one octet, indicating the physical structure of the coupler, without any indication as for the stored application software;
the state of the coupler, occupying one octet, with one bit indicating if the coupler is operative or not, and
a zone of 8 octets reserved to the options.

A channel context is arranged as it follows:
one octet indicating the number N of channels processed by the coupler;
a N octet table describing the state of the N channels and indicating wether or not the channel is in operation, with its priority;
a synchronising word table, i.e. a word of one octet per channel, i.e. N octets;
a rate table, a code between 1 and 25 indicating the maximum authorized rate for each channel, i.e. a field of N octets;
a maximum format table, i.e. of the maximum number of octets in a data block, or N octets;
a table for the channel numbers XYZ, i.e. 2N octets, and
a zone of 8 octets reserved for the options.

A control operation will be now described.

As hereinbefore mentioned, the set of the operating parameters for the access point according to the invention is grouped within a context. As far as it is concerned, the latter is used by the central processor. But the major part of the parameters concerns the couplers, which corresponds to the notion of local context. Therefore, it is necessary to provide a transfer processus of the information from the central processor MPC which monitors the context, to the couplers. In practice, the image of the local context relating to the involved coupler is stored in each coupler. A control from the central processor consists in a complete or partial change of the image of the local context, the corresponding information being transferred to the coupler.

Indeed a control is a dialogue between the central processor MPC which sends the control and the coupler Cx which receives it, takes it into account and supplies an execution acknowledgment.

That dialogue is established within a table shown in FIG. 10 and located in the shared memory MCx of the coupler Cx. More precisely, the table begins at the first address of the shared memory zone MCx, i.e. the memory to which the local processor MUPx and the central processor MPC have access through the bus MB. That address is a specific parameter of an application and is implicitly known by the central processor.

The dialogue table comprises:
- one octet for the control word used by the central processor MPC for indicating the type of the sent control, and in which the bit "7" is a synchronizing flag allowing the central processor to indicate that it has sent a control by setting said flag to "1", and the coupler to indicate that it has taken the control into account by setting said flag to "0";
- one octet for the control ackowledgment, which allows the coupler to indicate the answer given to the control;
- one octet giving the operation state of the coupler, in which the bit "7" indicates that a fault in the coupler keeps it from operating, the other bits being possibly used within the scope of an application;
- a zone of 8 octets for the control parameters, which allows the transmission of specific parameters which cannot find place in the local context;
- 2 octets for the address of the output buffer state table, that address concerning the transfer mode which will be described in the following;
- 2 octets for the address of the local context image, the coupler being capable to store its own local context image at any place in the shared memory MCx.

Figure 11:
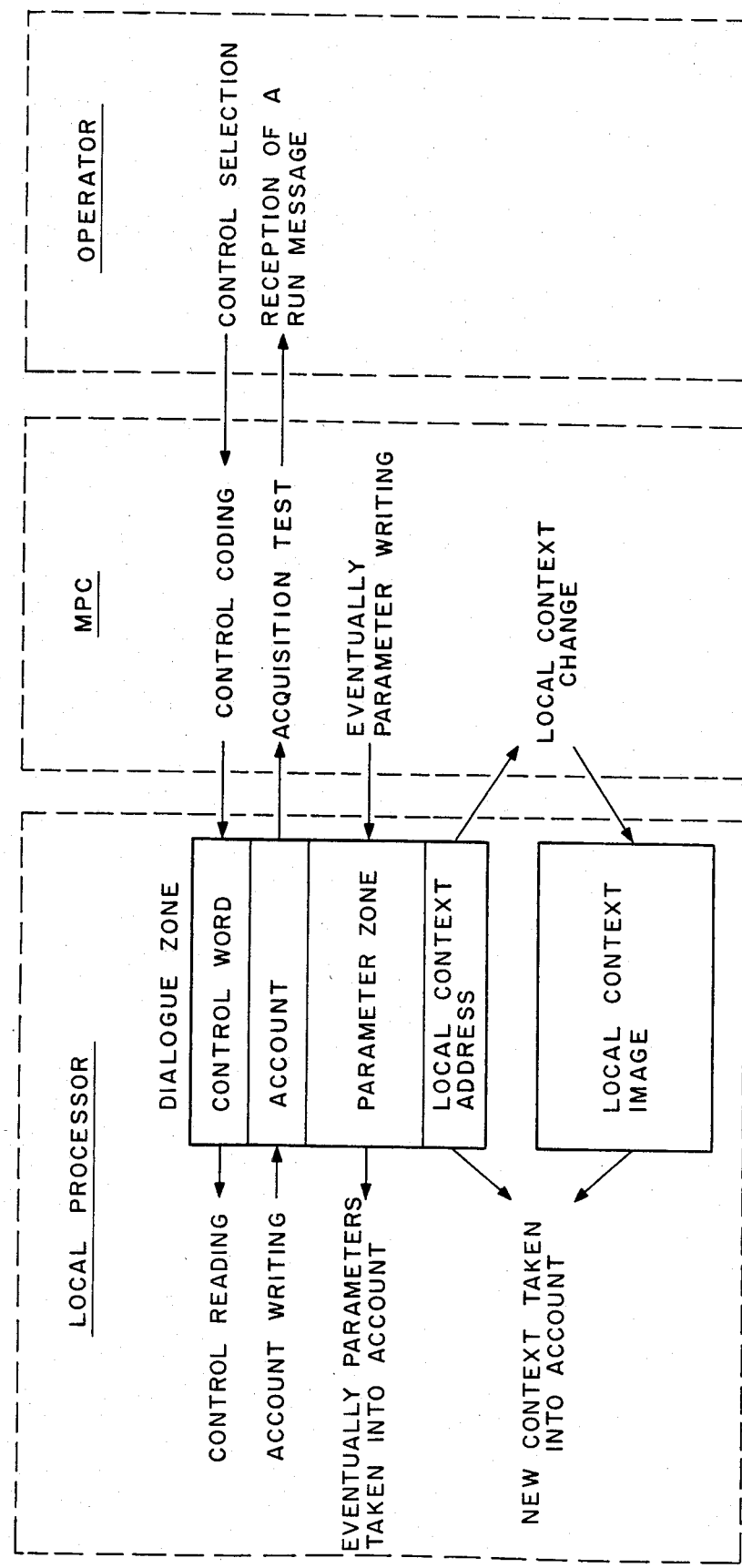

The flow chart of the control operations is shown in FIG. 11 and will be now described by using the various entities constituting the contexts and the dialogue table which have just been described.

The central processor MPC has always the initiative, frequently at the request of the operator by means of the keyboard of the circuit OCC. First, the processor MPC makes sure that the last control concerning the involved coupler has been taken into account by examining the bit "7" of the control acknowledgment word; then, it updates the image of the local context by a partial or total re-write operation, and, at last, it positions the control word by setting its bit "7" to "1".

Each coupler is permanently in a control wait condition, i.e. it observes the control word and detects when the synchronising flag bit "7" is set to "1". The system could have another possibility which consists in generating an interruption on control word write. It will be recalled that the address of such a word is not free since it is imperatively the first in the shared memory MCx.

Then, the control is analysed, the acknowledgment is positioned, the correct processing is performed and the synchronising flag bit is set to "0".

It has been possible to determine general rules for the control mode, but it remains necessary to provide for a number of options which are different for each application and have to take into account the specificity of a given coupler or a given application software.

On the contrary, in the transfer mode, the rules are simpler and completely and definitively determined for all the applications.

The couplers C1-Cn, simple or complex, single or multi-path, supply to the multiplexer MX, under control of the central processor MPC, the data grouped in a same and unchanging form, i.e. the complete DIDON pack, with the header and the data block, stored in a buffer of which the size is at least equal to the maximum length of the packs for the involved application.

A polling concept has been chosen instead of the interruption process which would have been difficult to implement due to the fact that the architecture is greatly decentralized. Anyway, polling has the advantage of insuring a minimum processing power adjusted at will for the background tasks such as the operator dialogue or the supervision of the channel activities.

When incoming through an access circuit CAS-1-CAS4 or CAP1-CAP4 of a coupler Cx, the data octets are stored in a buffer. They remain in the buffer up to the dispatch time, at which time they are transferred into the buffer memory MTP of the multiplexer MX. An instantaneous state is assigned to each buffer in order to determine the evolution of a DIDON pack. The operations undertaken by the processors will depend on the value of said state, in conformity with the precise rules of the transfer mode.

The state of a buffer comprises three symbols, all of the binary type:
symbol 1: FREE/BUSY
symbol 2: INPUT/OUTPUT
symbol 3: EMPTY/FULL If the buffer is free (symbol 1), the other two symbols are not significant.

Figure 12:
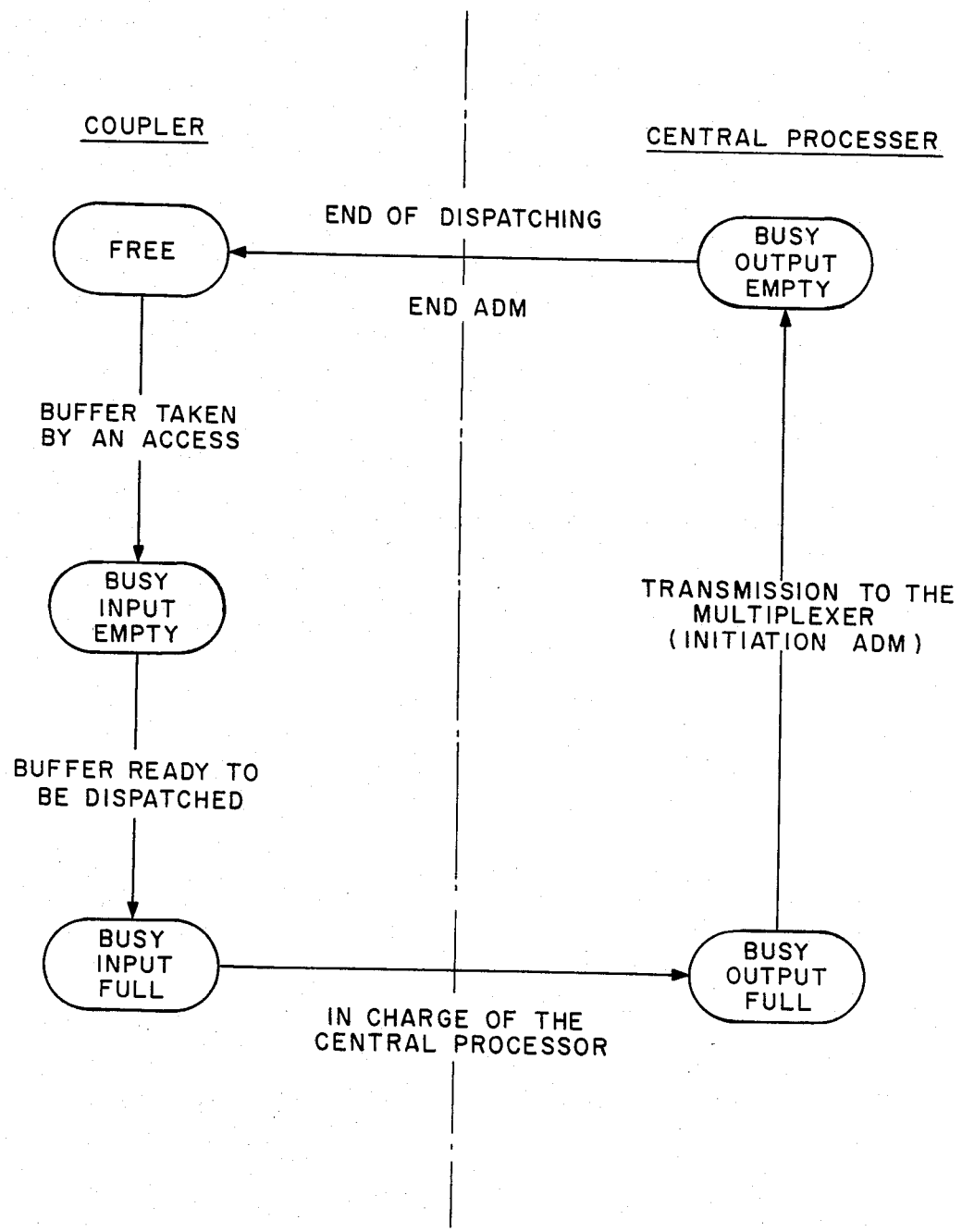

The state diagram of the buffers is shown in FIG. 12. The zone processed by the coupler, at the left hand, has been distinguished from the zone processed by the central processor, at the right hand.

The state FREE is the wait condition, when the buffer is unoperative.

The state BUSY-INPUT-EMPTY means that the buffer is assigned to an access and that it is under filling. Thus, the word "empty" has not here its conventional meaning.

The state BUSY-INPUT-FULL means that the DIDON pack contained in the buffer is ready for dispatching, and, in particular, that the index and the format have been updated in its header and that the flow control conditions have been checked. The later state is the most important as it constitutes the interface between the coupler and the central processor.

The following state BUSY-OUTPUT-FULL corresponds to the fact that the buufer is now handled by the central processor which transmits polling orders to the couplers. If the conditions allow it, the central processor MPC then initiates the exchange ADM, i.e. the memory direct access exchange, between the memory MCx of the coupler and the memory MTP of the multiplexer MX; the buffer is then set to the state BUSY-OUTPUT-EMPTY, indicating that an exchange ADM is under process. At the end of the exchange ADM, the buffer is disengaged (state FREE) and is thus ready for being filled again.

The state octet of the buffer is completed by a page number of 4 bits. It indicates the page of 64K octets wherein the buffer is. Thus it is possible to have an adress field of 1M octets, but a buffer cannot straddle two pages of 64K octets.

It is necessary that the instantaneous states of the buffers can be stored. Also, it is necessary to know the actual address of the buffers in order to give it to the circuit CADM.

In the dialogue table shown in FIG. 10, a buffer state address table is provided. In practice, said table shown in FIG. 13 is made of zones respectively corresponding to the buffers processed by the concerned coupler.

Each of the zones shown in FIG. 13 comprises:
the state of the buffer, on one octet;
the address of the buffer, on two octets;
a chaining address corresponding to the state address of the next buffer, on two octets.

The chaining makes unnecessary for the central processor MPC to know the number of buffers used by the concerned coupler.

The above mentioned zones with the dialogue table and the context image are located within the shared memory MCx to which the central processor MPC has access. Since said zones are chained, they can be jointed or not.

In order to ascertain that the multiplexer operates in an optimum manner, the minimum number of buffers is equal to 2, so that a pack is always ready at the end of the exchange ADM.

In anticipation with respect to the following description, il will be noticed that the behaviour of the coupler is very simple in the transfer mode.

For avoiding any overflow, the rule is to search for a free buffer by examining the states of the various buffers according to the following two rules:
a FREE buffer is taken and assigned to one access;
if the buffer is not FREE, it is a saturation case and it is necessary to wait for its disengagement.

All the buffers are set to the state FREE when the system is initialized.

The rules for taking the initializations into account will now be described.

It is necessary that each processor can be selfinitialized, in particular when the system is turned on. The central processor is the absolute master of the system, particularly at the time of the general initialization.

Two initialization levels are defined as it follows:
Initialization level 1, controlled by a RESET of the multibus, i.e. by a control of the type 01;
Initialization level 2, controlled by the transmission of a control of the type 02; it is the case of the context change.

The two levels are chronologically in the described order.

The behaviour of each coupler is as follows:
for an initialization level: the coupler becomes inoperative; it initializes its dialogue table and its internal variables, i.e. the variables which do not depend on the local context. After that, it enables the control by the bit b7 of the control word and waits for a control of the type 02 while as any other control must be disregarded.
for an initialization level 2: the coupler initializes the variables which depend on the local context, which is now available, and becomes normally operative.

The software of the central processor MPC will now described, that software being called "central software" in the following.

The central software has several functions which comprise:
initialization of all the entire access points;
supervision of couplers and multiplexing;
supervision of the outgoing channels;
dialogue with the operator.

Figure 14:
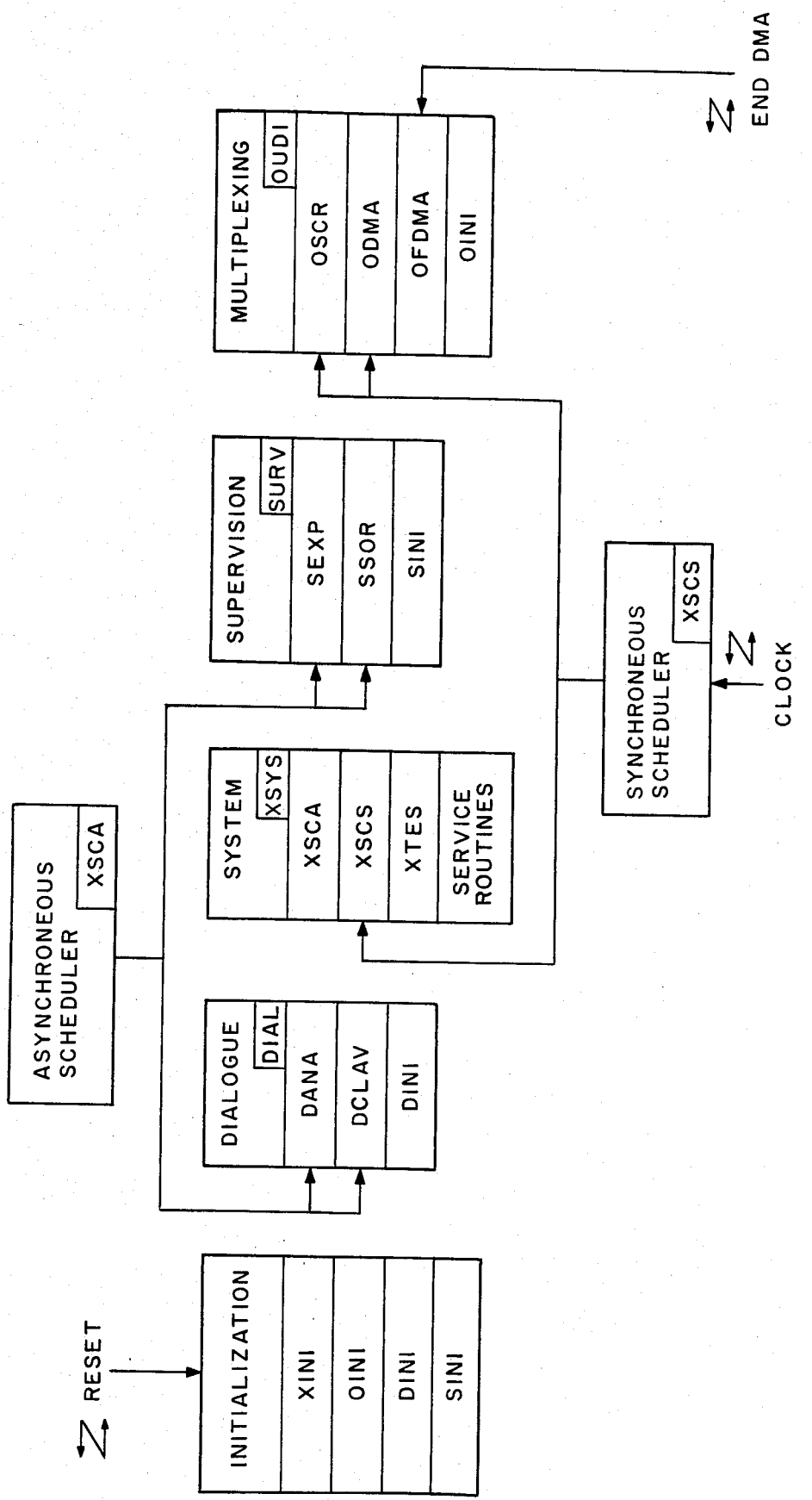

The modules corresponding to those various tasks are grouped in the general diagram shown in FIG. 14. Each module comprises a number of processus. Among those processus, the initialization processus allows each module to prepare its internal variables and initialize the peripherals that it controls, in conformity with the principle of a decentralized initialization.

Thus, in practice, the subroutine entity is the processus. A processus may be initiated in three different manners:
by another processus said "calling processus";
by the synchroneous scheduler XSCS; or
by the asynchroneous scheduler XSCA.

All the tasks to be performed by the routine need a cyclic initiation of those processus according two methods:
the synchroneous initiation, with a fixed period provided by a clock, of processus having real-time imperatives, which essentially relates to the properly said multiplexing function, which must be enabled at "fixed hours" in order to have a minimum output flow whatever be the charge of the central processor, and the timing central function.
the asynchroneous initiation in which the asynchroneous scheduler XSCA operates background task, i.e. it initiates its processus during the non-active periods of the synchroneous scheduler XSCS, and that concerns in particular the operator dialogue and the supervision of the outgoing channels.

In addition to schedules XSCA and XSCS, FIG. 14 shows a system module XSYS, a multiplexing module OUDI, a supervision module SURV and a dialogue module DIAL, plus a group "INITIALIZATION" wherein are grouped the initialization processus XINI, OINI, DINI and SINI relative to the various modules are grouped.

The processus of the system module are summed up hereinafter, with, for each processus, the type, the call mode and the function(s):

XINI - Initialization processus of the access point,
type: subroutine
call mode: Reset interruption by the operator
functions:
initialization of the access point variables,
initialization of the peripherals,
initiation of the initialization processus of the other modules
initiation of the initialization controls for the couplers,
initiation of the asynchroneous scheduler XSCA.

XSCA - Asynchroneous scheduler, which is also schematically shown, out of XSCS, for a better understanding of the description.
type: background task
call mode: none
function: initiation of the asynchroneous processus.

XSCS - Synchroneous scheduler, also shown separately.
type: subroutine
call mode: clock interruption
function: initiation of the synchroneous processus XTES - Timing control
type: processus,
call mode: synchroneous scheduler
function: control of every timing in the access point, of which the list is as follows:
1 Processor, indicator RUN
2 Saturation indicator
3 Supervision flag
4 Indicator display
5 Closure operator control
6 Transmission of time to the couplers It will be recalled that a timing is defined by:
a reference value,
a current value, and
a state.

Figure 15:
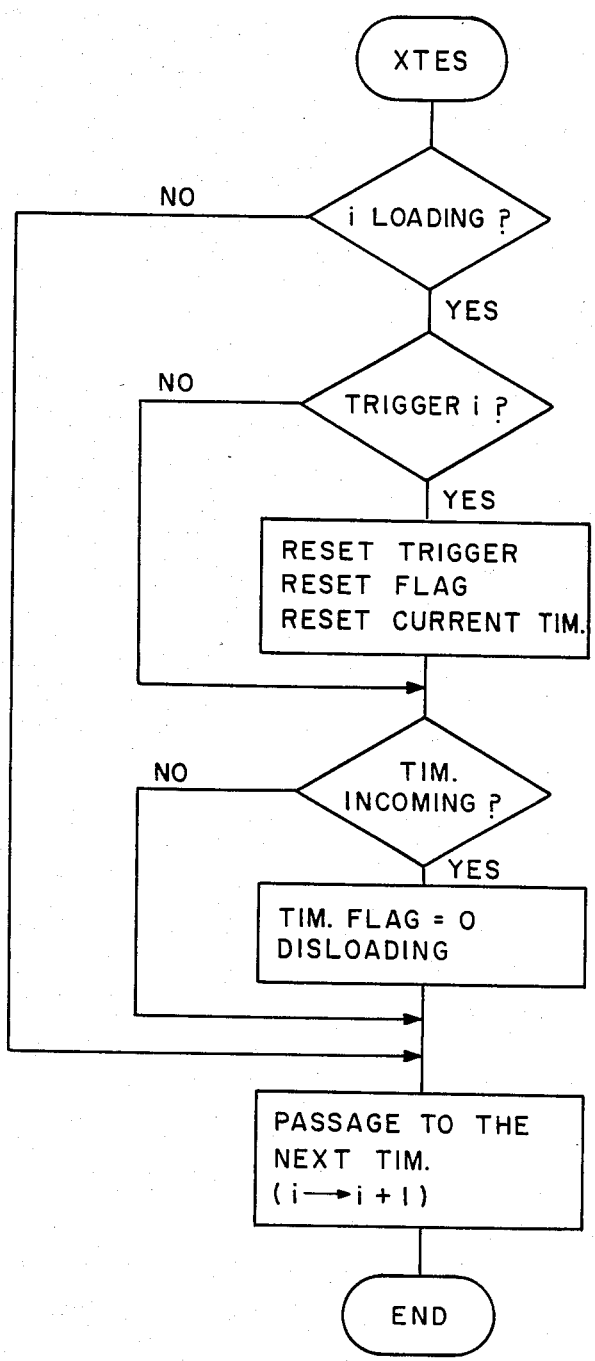

The processus XTES increments the current values and positions the state at "incoming timing" when the current value has reached the reference value. Any other processus may initiate one or another timing, or synchronize one or another timing, i.e. reset its reference value, whether or not the timing has been initiated. The flow diagram shown in FIG. 15 illustrates the processus XTES.

Furthermore, in the box "Service Routines", the module XSYS contains a set of service subroutines as follows:

XCOM - Transmission of the controls to a coupler
Call mode: Calling processus which defines the coupler number, the control number and the control conditions.

For the acknowledgment type, XCOM waits for the acknowledgment of the coupler before passing the reins to the calling processus.

XCPTR - Reading of the control account of a coupler.
XCPET - Reading of the operating state of a coupler.
XEXPA - Generation of the expanded identifier table (XTvoi)

It will be recalled that, in the contexts, the channel identifications or numbers are in a packed form:

X Y
Z U

U being the number of the coupler managing the channel XYZ.

In order to facilitate the processing of said identifiers, it is preferable to use a table said "expanded table XTvoi", wherein the identifiers are in the form:
X
Y
Z XEXPA reads the list of the identifiers out of the general context under progress, and duplicates it in expanded form in XTvoi.

XCTX - Loading of a context
XCNTX is the variable zone of the context under program at a given time. XCNT1, XCNT2, etc., are constant zones of contexts among which a choice may be made. The subroutine XCTX will search one of those zones for duplicating it in to the zone XCNTX.

XEFEN - Equalization of the windows of the two frames
If DIDON is normally used, the window is the same in the two TV frames. XEFEN insures that the windows are identical by duplicating the state of the odd frame in to the even frame since it can be deduced from the odd frame by initiating the subroutine XEFEN.

XMOV - Transfer of a memory zone.
XFIL - Filling of a memory zone with a fixed value.
XHAMB - Hamming decoding
XHBCD - hexadecimal/BCD conversion
XBCDB - Dialogue BCD/binary, with result on 16 bits
XMUL - Multiplication of a byte with a double byte
XDIV - Division of a double byte by a double byte
XRII - Searching for the channel index The channels are identified by their identifiers XYZ. All the tables of the system relative to the channels are grouped in the same order, so that the channels may be defined within the routine by their indexes in said tables.

Indeed multiplexing module performs the base function of the access point. That module has two types of activity:
scanning of the couplers,
initiation of DMA exchanges to the multiplexer MX.
It comprises four processus:

OINI - Initialization processus
Call mode: calling processus
In addition of the initialization to the internal variables of the module, it has to initialize the multiplexer, i.e.:
position the control register,
initialize the DAM, and
initialize the window.

Figure 16:
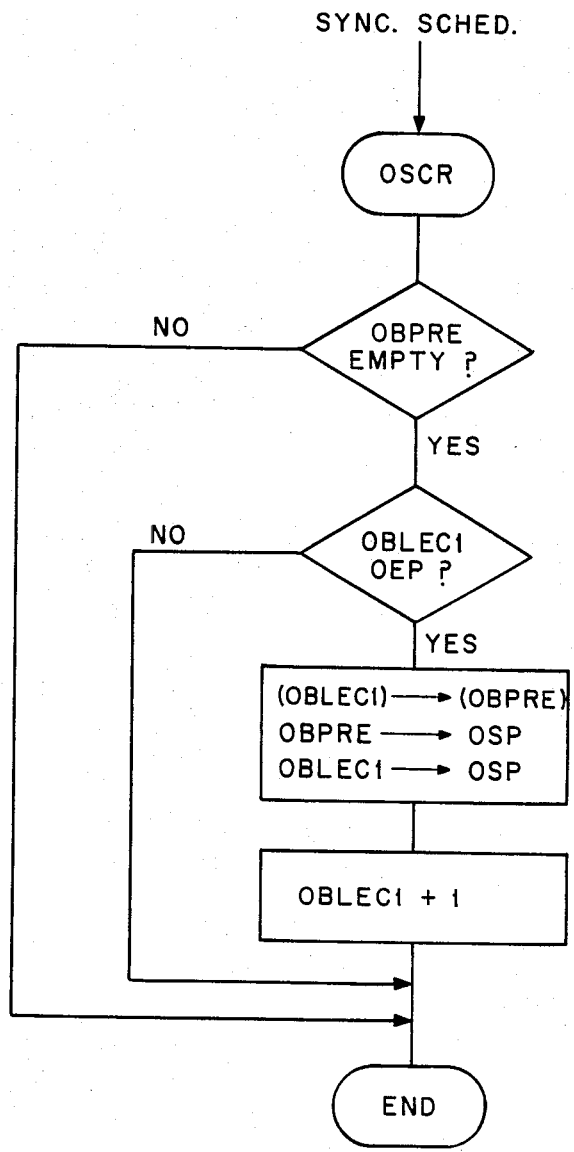

OSCR - Supervision of the buffers
Type: processus
Call mode: synchronous scheduler
It has to scann the coupler buffers so as to detect a full buffer, as indicated in the flow diagram shown in FIG. 16. In this case, the processus set the buffer in to wait condition, and it stores its address, in particular. That buffer, in wait condition, will be re-processed by the processus ODMA.

ODMA - Dispatching packs
Type: processus
Call mode: synchronous scheduler
It has to supervise whether:
(1) a buffer is in wait condition,
(2) ADM has completed for the previous exchange,
(3) the multiplexer is ready to acquire a pack.

During that subroutine, three tables are looked up: a table OBLEC storing the addresses of the packs in the various couplers, a table OBPRE storing the address of the buffer which has been put in wait condition by OSCR, and a table OBSOR storing the address of the buffer which has been put in dispatch condition by ODMA.

Figure 17:
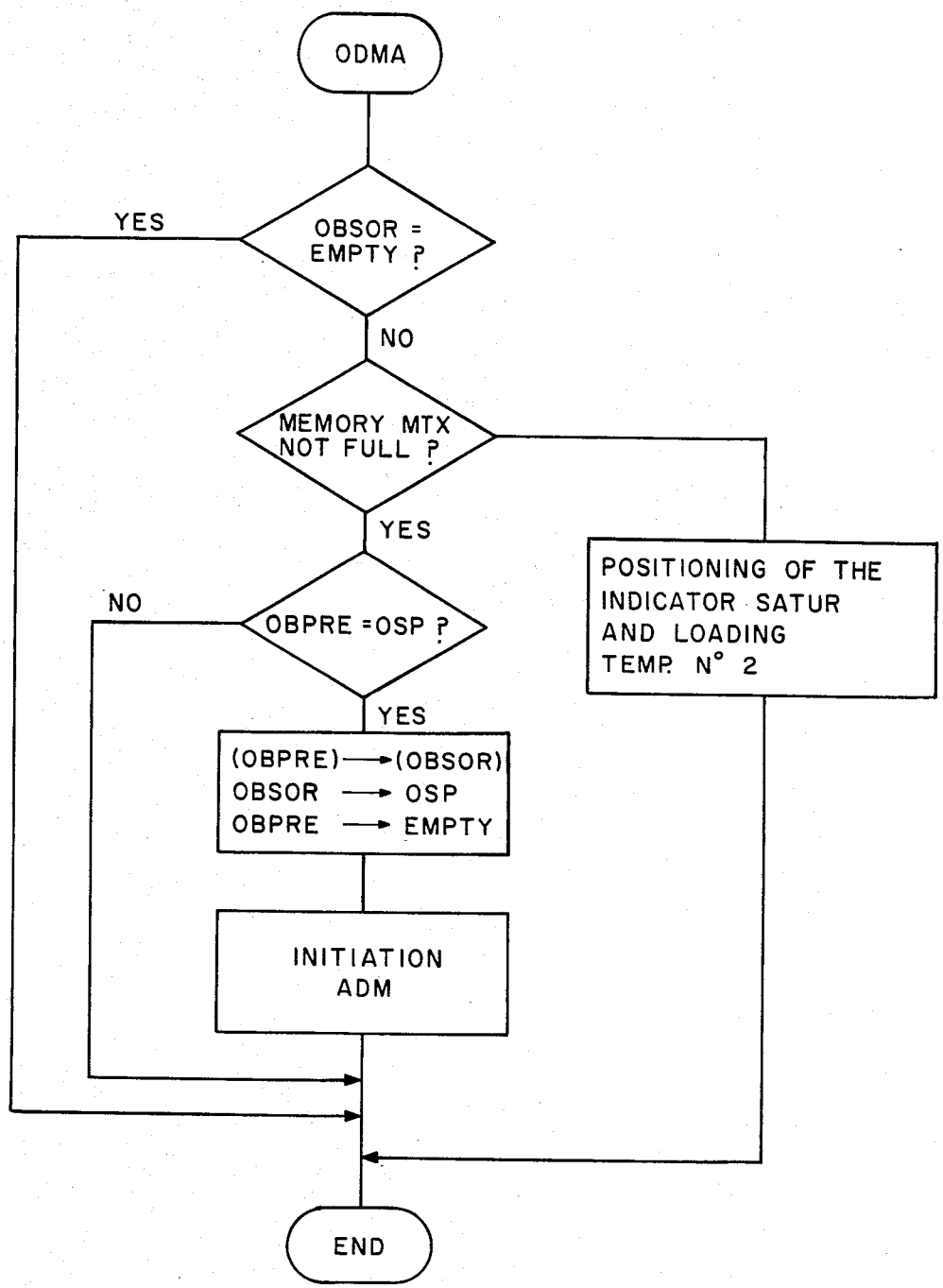

Those tests are shown in the flow diagram of the FIG. 17, and, where they are positive, ODMA initiates the ADM exchange. Furthermore, the condition "full memory" of the multiplexer M is tested by ODMA which eventually activates the indicator SATUR.

In practice, ADM hereabove mentioned exchange involves the transmission, from the central processor MPC, to the circuit CADM of the multiplexer MX, of the identity of the coupler Cx wherein a buffer has been found in wait condition, and the address, found in that waiting buffer, the buffer $A_i$ or $B_i$ of MCx wherein the pack to be transferred into MTP is located. How a buffer is put in wait condition will be described in the following.

Figure 18:
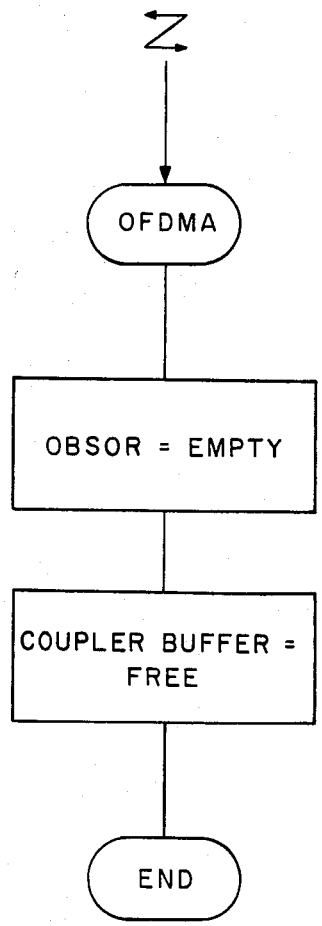

ODMA - End of the ADM
Type: subroutine
Call mode: interruption
When the ADM exchange has been completed, it has to release the buffer which has been dispatched. The corresponding flow diagram is shown in FIG. 18.

The supervision module SURV is enabled by the asynchronous scheduler. It is thus performed in the form of a background task.

It has to supervise the buffers which are dispatched by the multiplexer MX, i.e. by the module OUDI, and to note the channels which effectively transmit the packs.

The channels are identified by their identifier XXZ read out of the buffer. Eventually, the channel index allows to find the coupler number and the access number in the coupler so that to display them by means the correct indicators.

It will be noticed that it is a statiscal measure because every pack is not analysed. In practice, it can be noted that the number of examined samples is sufficient to ascertain the activity of the channels. The module SURV controls the tables SSURV, SNI, SNTOT, SNPA respectively storing the results of the samplings (i.e. the presence of a channel in line), the number of samples for each channel, the total number of samples, and the total number of the dispatched packs. The latter values allow to calculate an evaluation of the flow of each channel in order to indicate it to the operator.

SEXP - Scanning of the output buffers
Type: processus
Call mode: asynchroneous scheduler.

Figure 19:
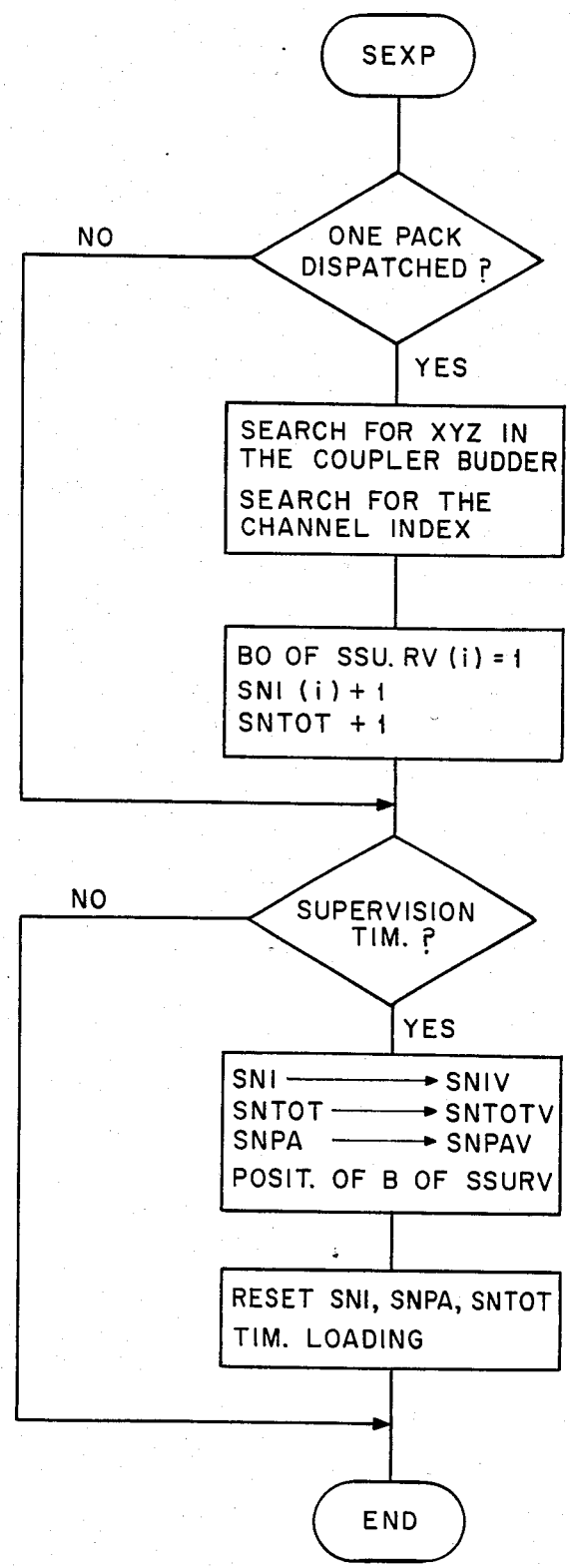

The processus SEXP is illustrated in the flow diagram shon in FIG. 19. It has to observe if a pack has been dispatched, if so, it searches for XYZ in the pack header, then, it computes the channel index by means of XRII and positions the tables of SURV for the involved channel, i.e.:
   the bit Bo of SSURV, flag of an active channel;
   SNI(i) the number of samplings per channel is incrementated,
   SNTOT the total number of sampling is incremented.

It has also to test a supervision timing and, if so, to store the results of the previous measures. To this end, all the tables of SURV (SN, SNTOT, SNPA) are duplicated in the tables SNIV, SNOTV, SNPAV storing the results of the previous samples. The results are thus determined values which can be read out at any time, contrary to the first ones which change at any time.

SSOR - Indicator output
Type: processus
Call mode: asynchroneous scheduler

Figure 20:
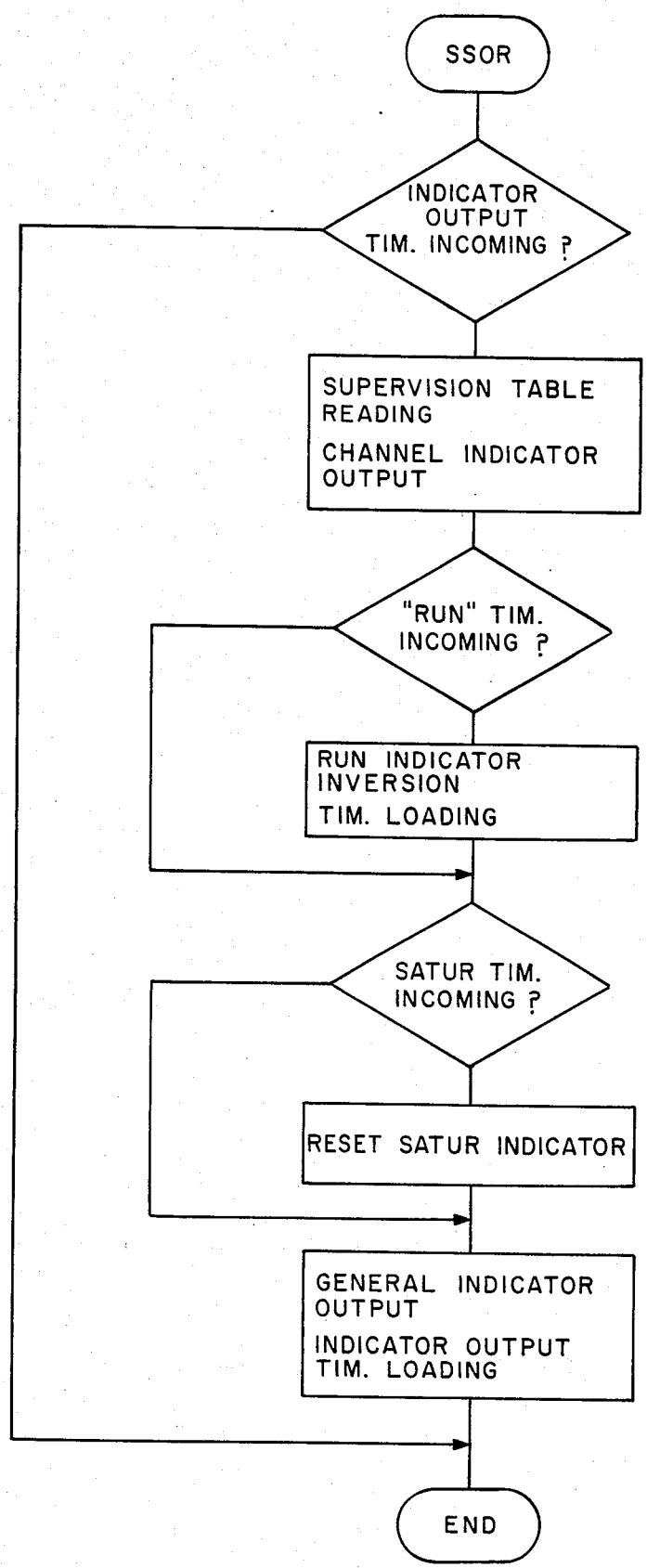

The processus is illustrated by the flow diagram shown in FIG. 20. It has to read the result of the statistical measures of SEXP by means of the tables SSUR, and therefore, to display it on the channel indicators. In fact, the indicators represent coupler physical accesses, the correspondence being made with the data contained in the channel contexts.

Furthermore, it also controls the general indicators of which the conditions are stored in the variable XVOYG. Among those indicators, there are:
   indicator RUN which blinks under control of SSOR with an appropriate timing,
   indicator INSERT IN THE IMAGE which is controlled by the processus OINI, initialization of the multiplexer, and
   indicator SATUR which is controlled by ODMA when the packs are dispatched and by the SSOR when it is reset after a certain time.

The dialogue module DIAL provides the interface with the operator by means of the control circuit OCC which comprises a keyboard and a number of hexadisplays. The LED indicators of channel activity are directly managed by the survey module SURV. Depending on the type of operation and the training of the operator, three complexity modes may be defined for the action of said operator:
   level 0: initialization of the system, the simplest operation which consists in resetting the apparatus to a fixed and known base state.
   level 1: selection of a context. Ten different contexts are stored in the ROM, and the operator may select a context said "current context". When the system is initialized level 0, the context 0 is taken as the current context.
   level 2: change in the context; a context having been previously selected (level 1), the operator may change any of the parameters within that context by means of specific controls.

The coupler software is implanted in the read only memory ROMx of the coupler Cx. The coupler software tasks are the following:
   reading the incoming characters applied to the 8 accesses CASI CAS4, and CAP1 CAP4, and packing them.
   dispatching the packs of the eight digital channels to the multiplexer MX.
   regulating the flows through the eight channels.
   controlling the interface protocol with the central processor MPC.

Figure 21:
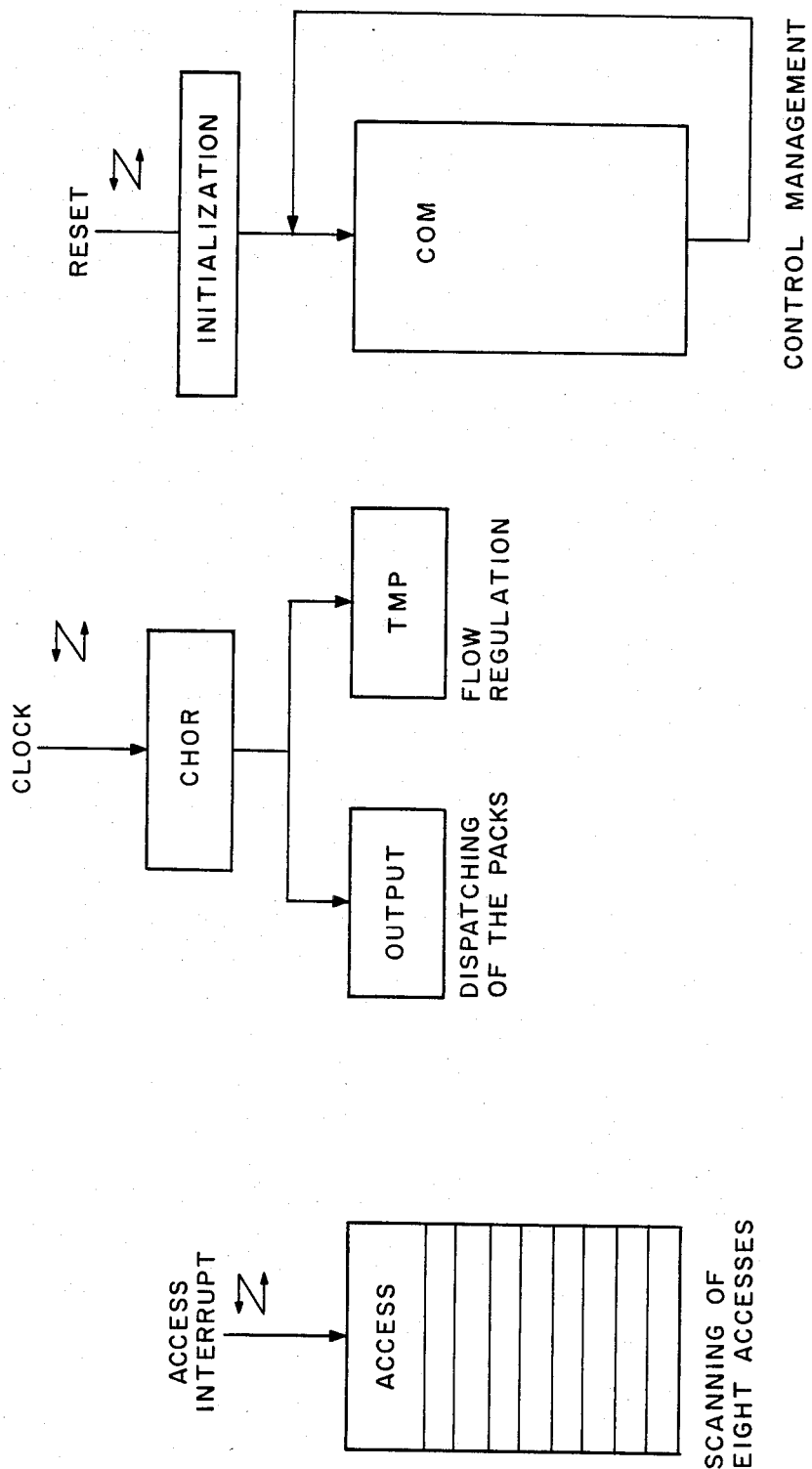

The architecture of the coupler sofware, which is shown in FIG. 21, is similar to the central softwre, but it is simpler. It is a programming with well identified modules called by a scheduler.

The essential part of the programm comprises four groups of modules:
   a module ACCESS which insures the reading of the incoming data and their packing; indeed it comprises eight submodules which are identical, each of them controlling an access and being enabled by interruptions.
   a module OUTPUT which is assigned to supervise the pack buffers of the modules ACCESS and decide the dispatching in conformity with a number of criteria.
   a flow regulating module TMP which has to control the pack transmission timings for each channel.
   a module COM which processes the controls from the central processor MPC.

The module ACCESS is enabled by the interrupts from the input circuits of the eight accesses. The modules OUTPUT and TMP are called at fixed periods by a synchroneous scheduler CHOR which is itself controlled by a clock.

The module COM has a background task status, and, therefore, it makes use of the available computer time when the other tasks have been completed.

The greater part of the data is arranged in correspondance with the eight controlled accesses.

First, there are the pack buffers: two buffers $A_i$ and $B_i$ per access, and an output buffer C. The buffer $A_i$ is used as the buffer under filling, and the buffer $B_i$ is used as the dispatch wait buffer.

Figure 22:
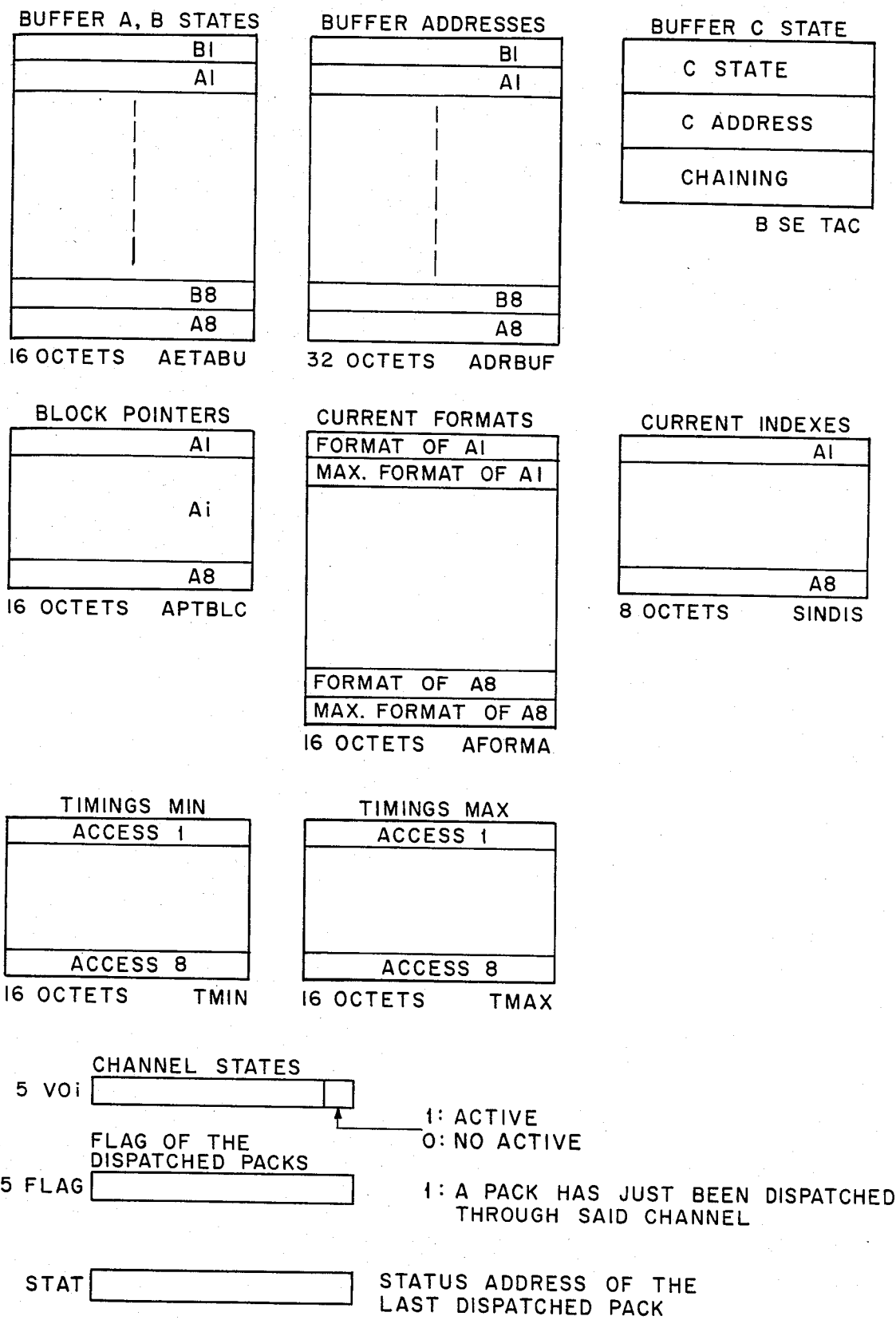

The other data are variable tables arranged in eight boxes for the eight accesses, with, in particular (FIG. 22):
   a table AETABU for the conditions of buffers $A_i$ and $B_i$, each of the sixteen buffers $A_i$ and $B_i$ being characterized by seven elements: priority or not, minimum time reached, maximum time reached, empty, partially full, full, type A or B; those conditions are analysed for the dispatch decision.
   a table ADRBUF for the addresses of the buffers
   a table APTBLC for the pack data block pointers.
   a table AFORMA for the current channel formats.
   a table SINDIS for the current channel indexes, and
   two tables TMIN and TMAX for the dispatch timings.

The various modules of the coupler software will be now described.

Figure 23:
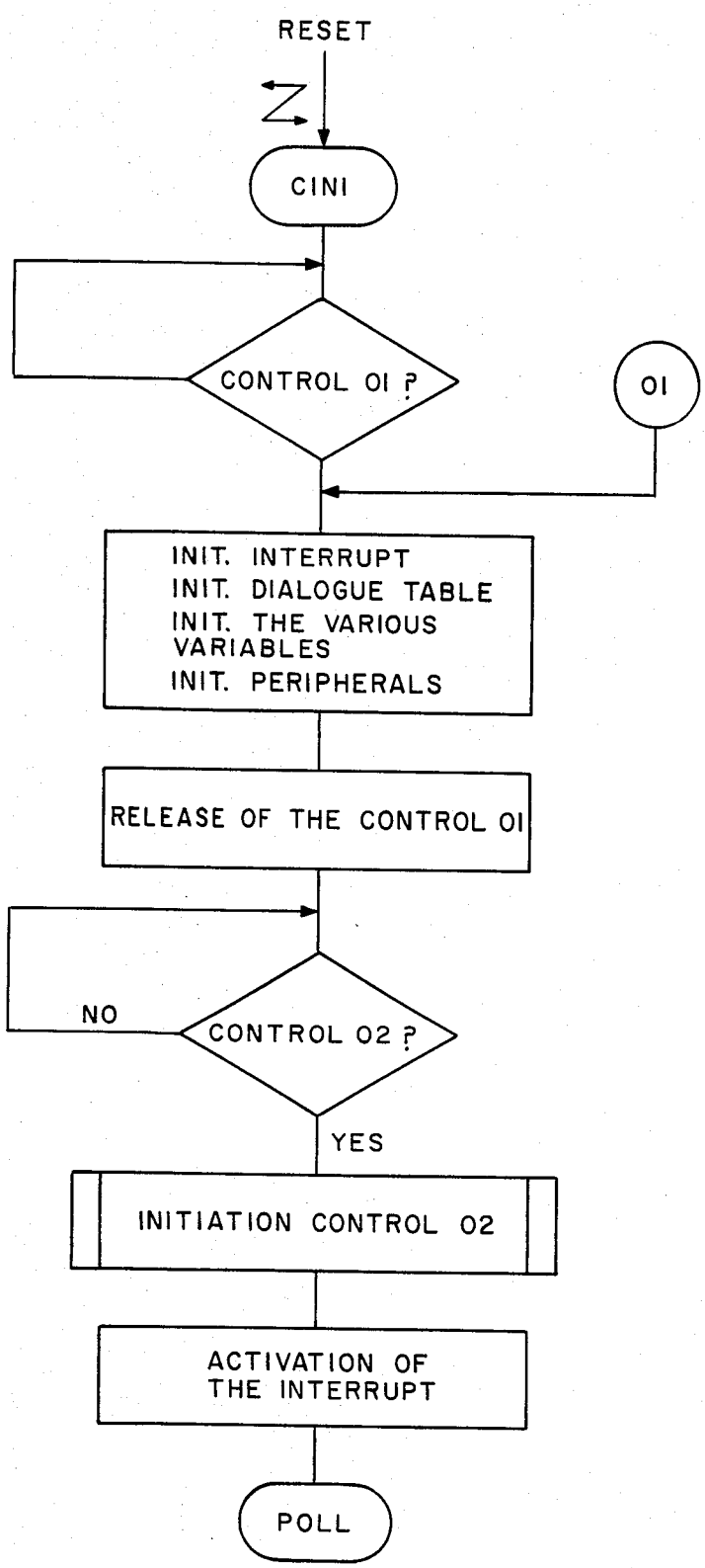

In general, the notion of processus does not exist; only the mode COM is divided in three parts: CINI, CHOR and POLL which are described hereinafter:

CINI - Initialization of the coupler routine
Type: processus
Call mode: interruption by RESET or call by POLL The processus is illustrated in the flow diagram shown in FIG. 23. It has to provide the control of the initalization protocol with the central processor MPC, i.e. the reception of the control 01, then of the control 02; then, CNI performs the initializations of the peripherals and the variable tables.

The module may be enabled either when the system is turned on, RESET, or in normal operation by the control management processus when the latter receives the control 01.

CHOR - Scheduler
Type: processus
Call mode: clock interruption.

Figure 24:
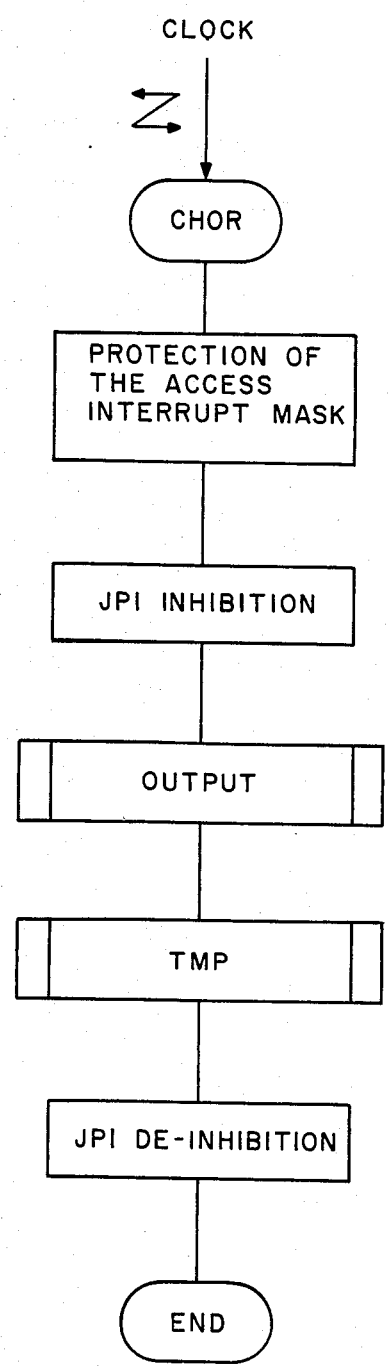

The processus is illustrated in the flow diagram shown in FIG. 24. It is a mini-scheduler which has to successively initiate the modules OUTPUT and TMP. When those two modules are running, the parallel accesses CAP1 CAP4 are inhibited in order that the dispatching and the time calculation are not delayed. On the contrary, the series inputs CAS1 CAS4 which are free-running cannot be inhibited without risking the loss of an octet. However, it is not a real difficulty since the flows of those accesses are relatively low: at most, one input every millisecond.

POLL - supervision of the controls of the central processor MPC
Type: background task
Call mode: none (loop)

Figure 25:
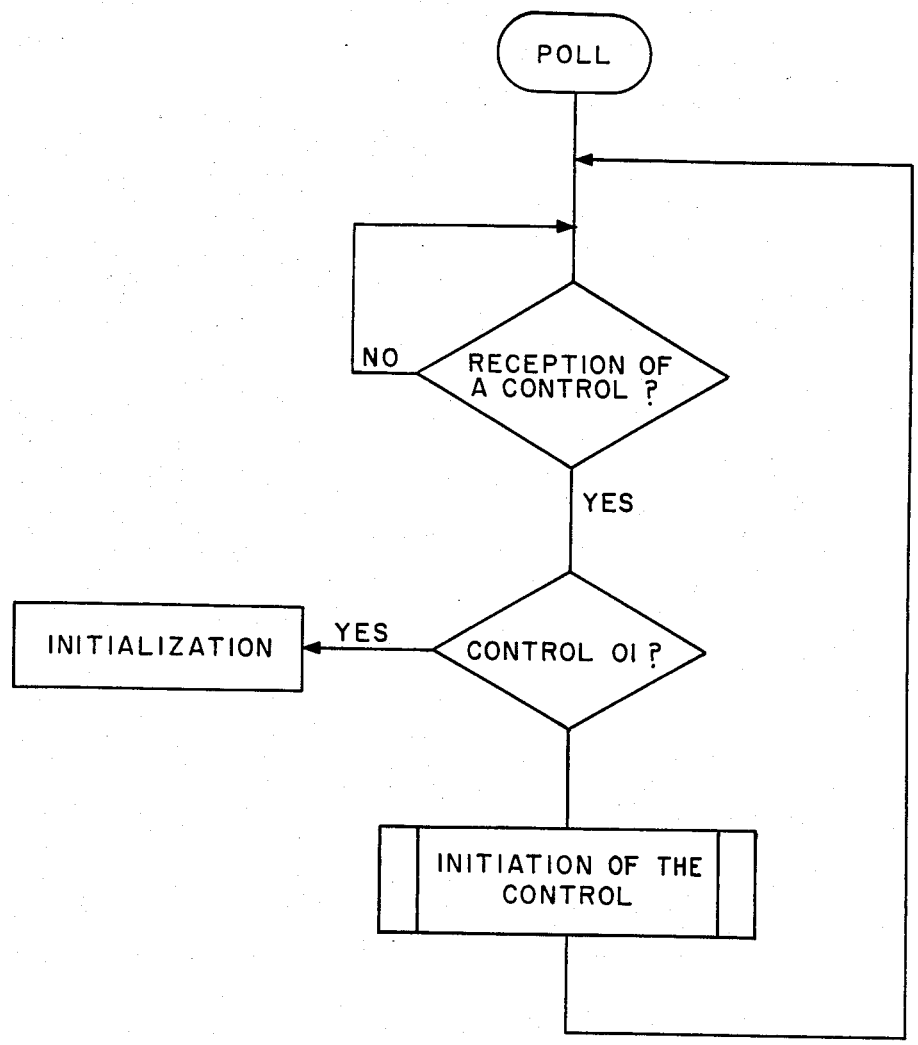
Figure 26:
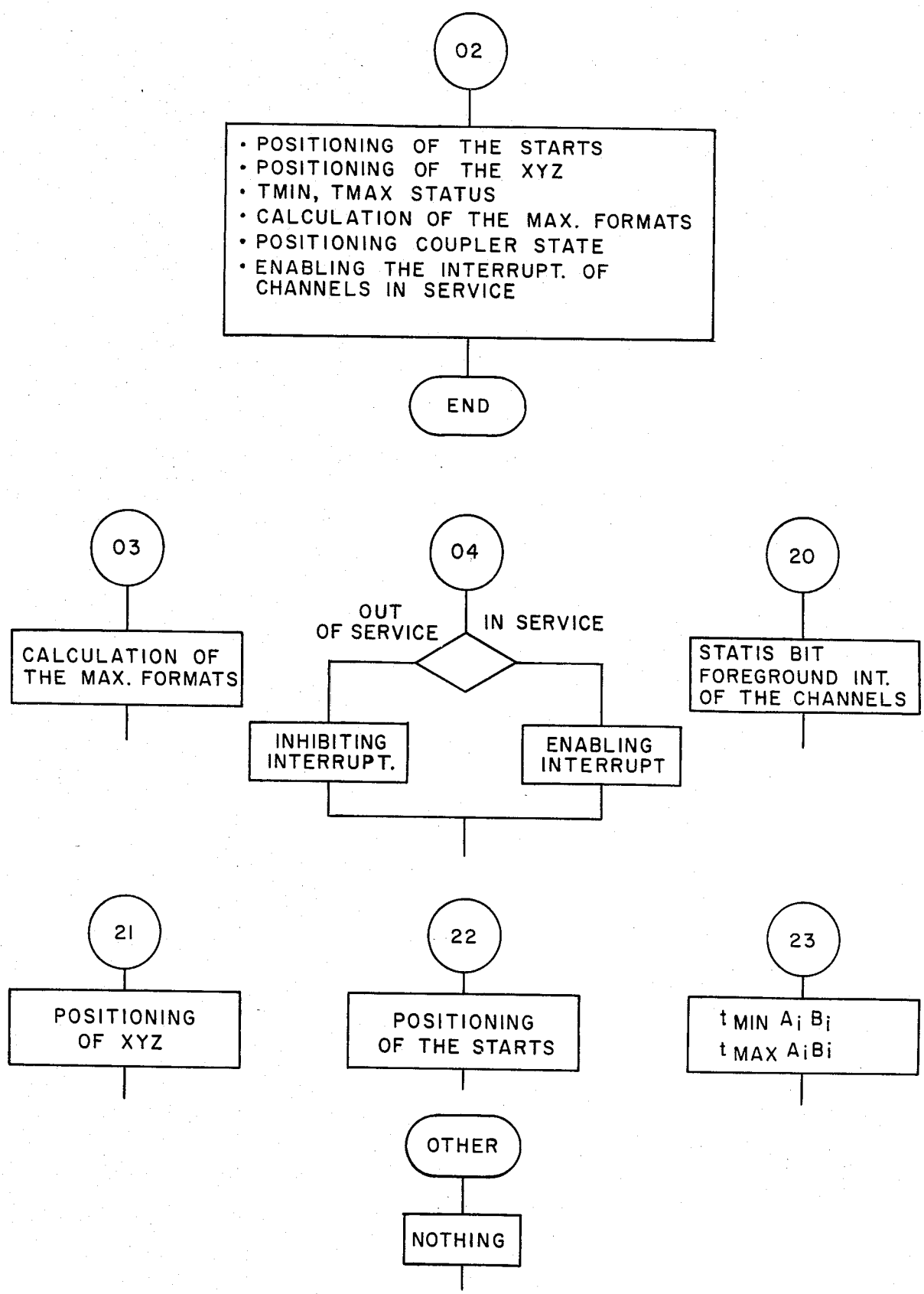

The subroutine is illustrated in FIG. 25. One of its functions is to scan the table provided for the dialogue with the central processor MPC. When it detects a control 01, it jumps to the initialization procedure (CINI). In any other case, it initiates the routine corresponding to the received control. The flow diagrams of these routines are illustrated in FIG. 26.

Control routine
Type: subroutine
Call mode: calling processus POLL

The routine functions consist in performing the specific tasks corresponding to each of the processed controls.

control 02: context change
Practically, it results in the re-initialization of every table in the system.

control 03: change in maximum formats
It is used for updating table AFORMA.

control 04: coupler on/off
The coupler is turned off simply by inhibiting any interruption. It will be noticed that, in this condition, the coupler continues to receive the eventual controls from the central processor MPC.

control 20: channel on/off
Suffice it to mask/unmask the corresponding interrupt control 21: change of the channel identifiers
The header of the packs is changed in buffers $A_i$ and $B_i$.

control 22: STARTS change
The header is changed as for control 21.

control 23: change in the flows
The tables TMIN and TMAX which give the timing value for each channel are changed.

Any other control is disregarded.

The other modules are described hereinafter.

Figure 27:
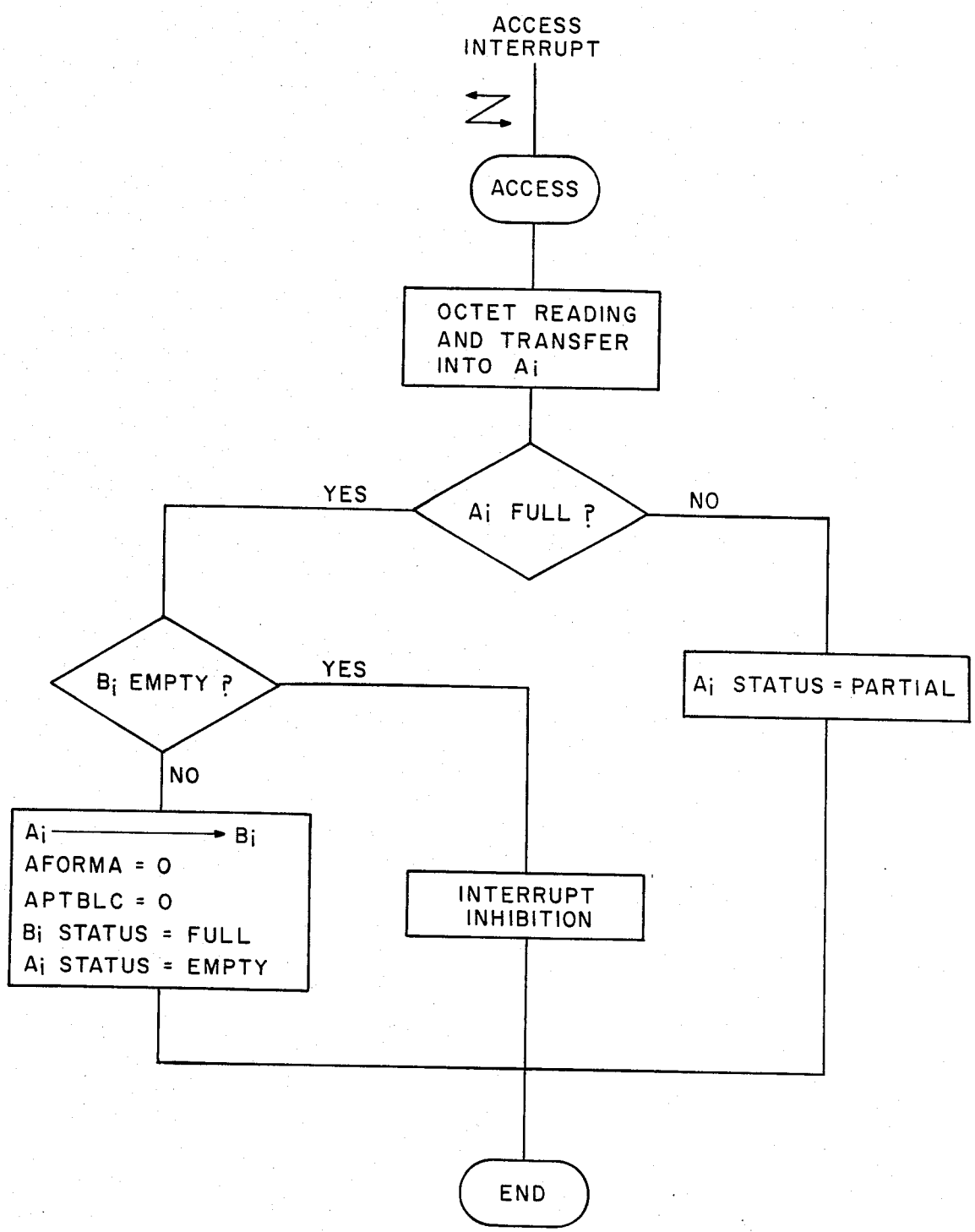

ACCESS - reading of an octet on one of the accesses CAS1 CAS4 and CAP1 CAP4,
Type: module,
Call mode: interruption The module is illustrated in the flow diagram shown in FIG. 27. It has in charge to read the octet and store it in the buffer $A_i$. It manages the transfer into $B_i$ when $A_i$ is full. To this end, it changes the condition of $A_i$ and $B_i$. In addition, in case of saturation, it inhibits the input by inhibiting the interrupt, the latter being re-activated when a pack belonging the corresponding channel is dispatched. The module access is the most critical part of the software since it operates at the level of one octet. It has been duplicated eight times for cancelling the indexed addressings which are very long if a microprocessor INTEL 8085 is used. Furthermore, it has been optimized to the maximum for limiting the number of instructions executed in the more frequent branch of the module.

OUTPUT - pack dispatching
Type: module
Call mode: scheduler

The module has two different functions: first, it has to analyse the conditions of buffers $A_i$, $B_i$, in order to decide wether or not a pack must be dispatched; then, if yes, it has to transfer the pack into the buffer C in order to dispatch it.

The selection of the buffer to be dispatched is made in two phases: first, a higher priority "eligible" buffer is looked up, bit 0 of the buffer condition; if the search is negative, a lower priority eligible buffer is looked up in the eight channels.

"Level 1" is the scan level for the higher priority buffers, and "level 2" is the scan level for the lower priority buffers. Within the same level, the buffer $B_i$, then the buffer $A_i$ are successively examined. For each additional scan, i.e. for an additional call of the module OUTPUT, the buffer B of the access following the one of the last dispatching is first analysed. It follows that there is no priority between the accesses, which are examined one after the another in a cyclic manner.

The dispatch decision is taken in conformity with the principle of the decision table. The table, FIG. 28, is addressed by the value of the buffer condition, and six output signals are retrieved which indicate wether the dispatching may be made at level 1 or 2, or wether the dispatching is not possible.

Figure 29:
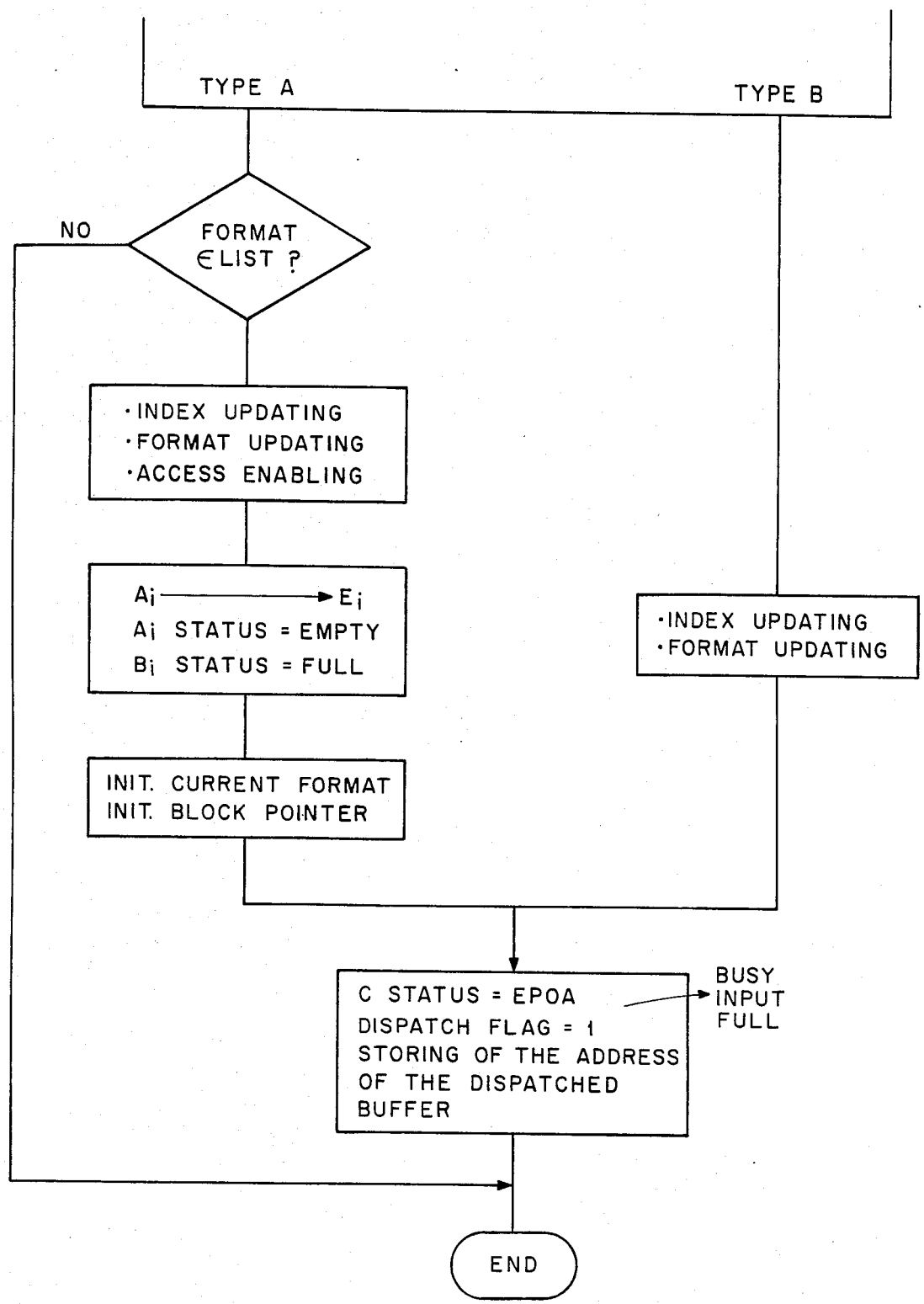

On the other hand, the dispatching from a buffer $A_i$ is distinguished from the one from a buffer $B_i$ of which the signals are different, the processing being not the same for the two cases as described hereafter with reference to the flow diagram shown in FIG. 29.

Case of dispatching from a buffer B: it is sufficient to update the index and the format which is the maximum format, since B is unavoidably full.

Case of dispatching from a buffer A: a buffer A is not unavoidably full; it must be verified that the current format pertains to the list used for this channel. $A_i$ is then transferred into $B_i$ which is empty, and the parameters of $A_i$ are re-initialized in view of the formation of another pack.

At last, the processus for preparing the dispatching is completed by programming of the condition of the buffer C: BUSY INPUT FULL condition and address of the pack. It will be noticed that the buffer C is in fact a fictive buffer. At any time, it represents one of the buffers $A_i$ and $B_i$.

In fact, the dispatching of a pack is decided in two cases:
  the buffer is full and the time interval $t_{min}$ between the transmission of two packs is reached, or
  the buffer is only partly full, and the time interval $t_{max}$ between the transmission of two packs is reached.

However, it will be noticed that, in the case of level 1, (high priority), the buffer is dispatched even if $t_{max}$ is not reached. Thus, a great number of incomplete packs may be dispatched, but this is necessary by the fact of the high priority character of the channel.

TMP - flow regulation
Type: module
Call mode: scheduler

Figure 30:
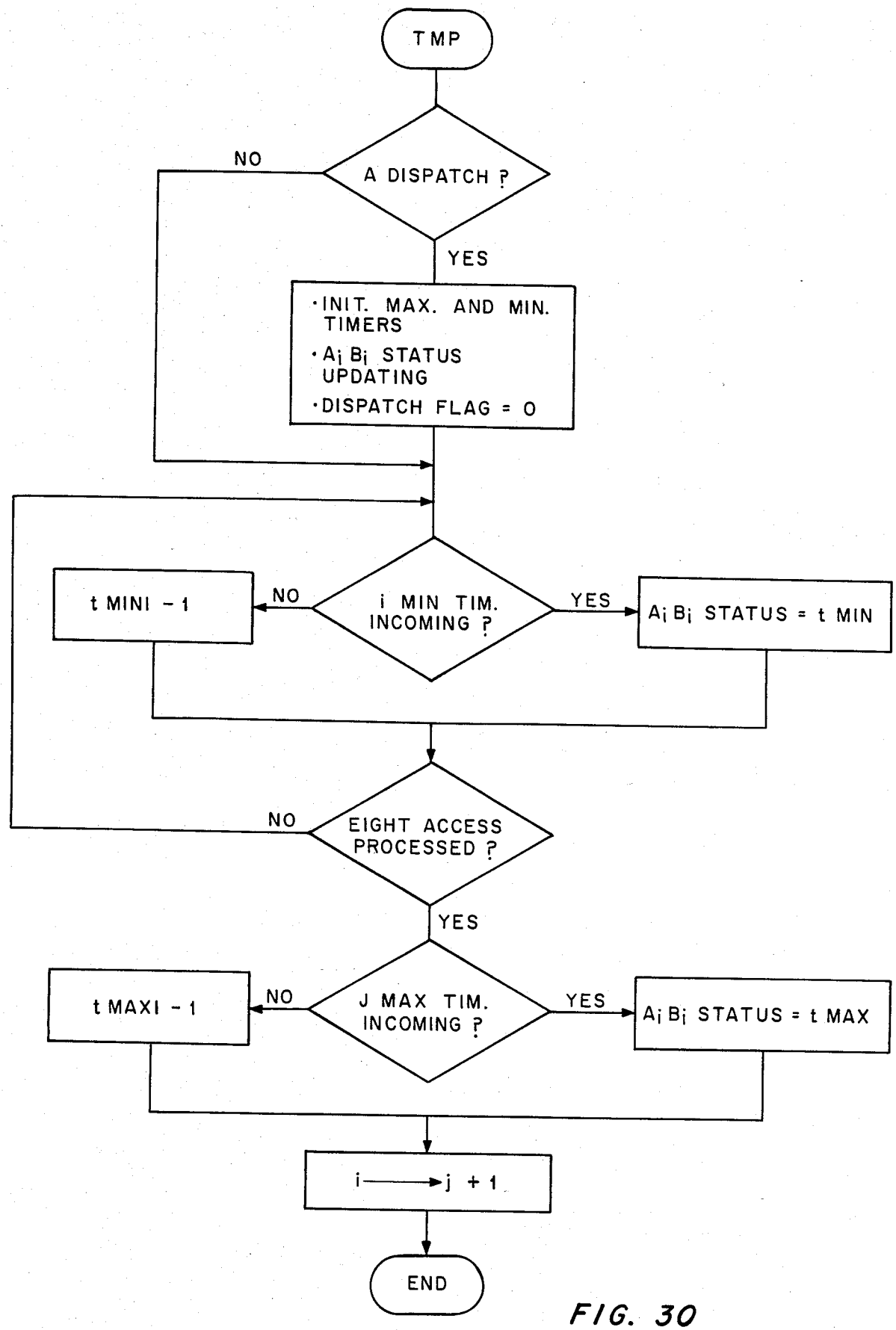

The flow diagram of this module is shown in FIG. 30. The module has to manage the bits $t_{min}$ and $t_{max}$ of the condition of the buffers A and B; those signals are timing signals or timers. Thus, they must be processed in real time due to the synchronous aspect of the scheduler, so that TMP is called with a constant and known periodicity.

A number of counters, in the form of tables $t_{min}$ and $t_{max}$, are associated with each channel and decremented by TMP. When one of the timers has completed its cycle, the corresponding bit $t_{min}$ or $t_{max}$ is set in one of the conditions of $A_i$ and $B_i$. Thus, the table TMIN is the base of the flow regulation which is thus performed at the level of the pack.

It will be noticed that, in theory, said regulation is faultless, as the actual flow of a source does not depend of the flow of the other sources at a given time.

However it is possible to program the channels with a maximum flow, corresponding to a value said "maximum flow", corresponding to a value $t_{min}=0$. In this case, the regulation by TMP does not operate. The resource is shared through interruption priorities somehow or other.

What is claimed is:

1. An access point structure for a network which broadcasts data packet, said access point comprising a plurality of coupler means, buffer memory means, and central control means all being interconnected by a main bus; means for coupling the buffer memory means to data packet transmission equipment of the broadcasting network;
   each of said coupler means including dual access memory means, microprocessor means, read only memory means, and a plurality of access circuits all being interconnected by a local bus, each of said access circuits being connected to a data source means, means in each of said coupler means for storing coupler control software and a set of subroutines for exchanging information with the buffer memory means; and
   switching memory means in the central control means for storing a connection table relating to a sequence for establishing time-division switched connections between said coupler means, and the buffer memory means, and for storing subroutines for controlling interconnections between each coupler and its associated data source.

2. The access point structure of claim 1 wherein each of said coupler means further includes a local access circuit means coupled between said dual access memory means and the local bus, and a general access circuit means coupled between the dual access memory means and control circuit means for controlling the connections between the main bus, the local access circuit means and the general access circuit means.

3. The access point structure of claim 1, and multiplexer means comprising said buffer memory means in association with write access circuit means and parallel-series converter means, and direct access memory circuit means, strobe memory means, multiplexer control circuit means, all being interconnected by a local bus, and a main bus control circuit for controlling the write access circuit, the buffer memory means storing data in adjustable sizes in response to the size of the broadcasted packets.

4. The access point structure of claim 2, and multiplexer means comprising said buffer memory means in association with write access circuit means and parallel-series converter means, and direct access memory circuit means, strobe memory means, multiplexer control circuit means, all being interconnected by a local bus, and a main bus control circuit for controlling the write access circuit, the buffer memory means storing data in adjustable sizes in response to the size of the broadcasted packets.

5. The access point structure of claim 1 wherein each of said coupler means receives data from the associated data sources connected thereto, said data being stored in the dual access memory means to form data packets which are ready to be transmitted, said dual access memory means having a plurality of buffers, two of said buffers in said dual access memory means being assigned to each of said data sources, testing means responsive to a degree of a filling of one of said two buffers for changing the data storage to feed into the other of said two buffers when said one buffer is full, means for scanning in a predetermined order the conditions of the two buffers, an output buffer, and means responsive to the result of the scanning and to the levels of priority for informing the output buffer of the address of a buffer having a data packet which is ready to be transmitted and for setting the ready buffer in a waiting condition.

6. The access point structure of claim 2, within each of said coupler means receives data from the associated data sources connected thereto, said data being stored in the dual access memory means to form data packets which are ready to be transmitted, said dual access memory means having a plurality of buffers, two of said buffers in said dual access memory means being assigned to each of said data sources, testing means respsonsive to a degree of a filling of one of said two buffers for changing the data storage to feed into the other of said two buffers when said one buffer is full, means for scanning in a predetermined order the conditions of the two buffers, an output buffer, and means responsive to the result of the scanning and to the levels of priority for informing the output buffer of the address of a buffer having a data packet which is ready to be transmitted and for setting the ready buffer in a waiting condition.

7. The access point structure of claim 3, within each of said coupler means receives data from the associated data sources connected thereto, said data being stored in the dual access memory means to form data packets which are ready to be transmitted, said dual access memory means having a plurality of buffers, two of said buffers in said dual access memory means being assigned to each of said data sources, testing means responsive to a degree of a filling of one of said two buffers for changing the data storage to feed into the other of said two buffers when said one buffer is full, means for scanning in a predetermined order the conditions of the two buffers, an output buffer, and means responsive to the result of the scanning and to the levels of priority for informing the output buffer of the address of a buffer having a data packet which is ready to be transmitted and for setting the ready buffer in a waiting condition.

8. The access point structure of claim 1 wherein each of said coupler means includes buffer storage means, the central control means scanning the conditions of the buffer storage means in the coupler means, multiplexer means for completing data packet transfer, means jointly responsive to an output buffer storage means in a waiting condition and to said multiplexer means having completed the multiplexing of a previous data packet for transferring the next data packet to the multiplexer means, direct access memory means, the central control means transmitting to the direct access memory means, the address read out of the waiting buffer storage means and the address of the coupler means associated therewith, and ordering a data packet transfer from the coupler means identified by the address read out of the said waiting buffer storage means.

9. The access point structure of claim 2 wherein each of said coupler means includes buffer storage means, the central control means scanning the conditions of the buffer storage means in the coupler means, multiplexer means for completing data packet transfer, means jointly responsive to an output buffer storage means in a waiting condition and to said multiplexer means having completed the multiplexing of a previous data packet for transferring the next data packet to the multiplexer means, direct access memory means, the central control means transmitting to the direct access memory means, the address read out of the waiting buffer storage means and the address of the coupler means associated therewith, and ordering a data packet transfer from the coupler means identified by the address read out of the said waiting buffer storage means.

10. The access point structure of claim 3 wherein each of said coupler means includes buffer storage means, the central control means scanning the conditions of the buffer storage means in the coupler means, multiplexer means for completing data packet transfer, means jointly responsive to an output buffer storage means in a waiting condition and to said multiplexer means having completed the multiplexing of a previous data packet for transferring the next data packet to the multiplexer means, direct access memory means, the central control means transmitting to the direct access memory means, the address read out of the waiting buffer storage means and the address of the coupler means associated therewith, and ordering a data packet transfer from the coupler means identified by the address read out of the said waiting buffer storage means.

11. The access point structure of claim 4 wherein each of said coupler means includes buffer storage means, the central control means scanning the conditions of the buffer storage means in the coupler means, multiplexer means for completing data packet transfer, means jointly responsive to an output buffer storage means in a waiting condition and to said multiplexer means having completed the multiplexing of a previous data packet for transferring the next data packet to the multiplexer means, direct access memory means, the central control means transmitting to the direct access memory means, the address read out of the waiting buffer storage means and the address of the coupler means associated therewith, and ordering a data packet transfer from the coupler means identified by the address read out of the said waiting buffer storage means.

* * * * *